United States Patent Office 3,196,155
Patented July 20, 1965

3,196,155
BIS(QUINOLYLAMINOALKYL)PIPERAZINES
Paul Gailliot, Paris, and Jacques Gaudechon, Sceaux,
France, assignors to Rhone-Poulenc S.A., Paris, France,
a French body corporate
No Drawing. Filed June 8, 1962, Ser. No. 200,953
Claims priority, application France, Jan. 3, 1961, 848,669;
May 29, 1961, 863,189; Nov. 16, 1961, 879,154; Dec.
29, 1961, 883,457; Mar. 20, 1962, 891,650
4 Claims. (Cl. 260—268)

This invention relates to new aminoquinoline derivatives, to processes for their preparation and to pharmaceutical compositions containing them. It is a continuation-in-part of our application Serial No. 162,918, now abandoned filed December 28, 1961.

According to the present invention there are provided new aminoquinoline derivatives of the Formula I:

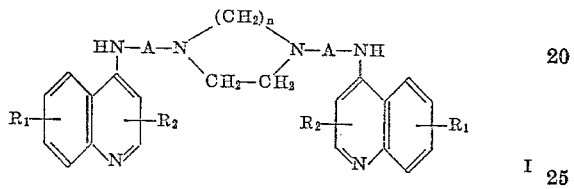

I wherein the symbols A represent the same or different divalent straight or branched chain aliphatic hydrocarbon groups containing 2 to 6 carbon atoms, the groups $R_1$ are the same or different and each represents a hydrogen or halogen atom or an alkyl, alkoxy, alkylthio, alkanesulphonyl, dialkyl sulphamoyl, amino, alkanoylamino, nitro, cyano or trifluoromethyl group in one of the 5, 6, 7 and 8-positions of the quinoline nucleus, the groups $R_2$ are the same or different and each represents a hydrogen or halogen atom or an alkyl group, a phenyl group, a halophenyl group or an alkylphenyl group in one of the 2 and 3-positions of the quinoline nucleus, the said alkyl groups and the alkyl, alkane, and alkanoyl portions of the said groups containing at most 3 carbon atoms, $n$ is 2 or 3 and the ring

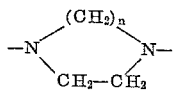

may contain one or more substituent alkyl groups of 1 to 4 carbon atoms.

When one or more asymmetric carbon atoms are present in the groups A the compounds may exist in stereoisomeric forms. The present invention includes all such stereoisomeric forms of the compounds of Formula I and also the acid addition salts of all such compounds.

The new compounds of Formula I may be prepared by a wide variety of methods, of which the following are exemplary:

(a) By reacting a compound of the Formula II:

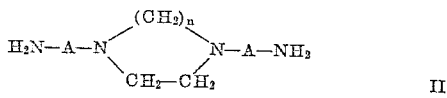

II (wherein A and $n$ are as hereinbefore defined and one or more of the carbon atoms of the heterocyclic nucleus may carry an alkyl group containing 1–4 carbon atoms) with two moles of a quinoline derivative of Formula III:

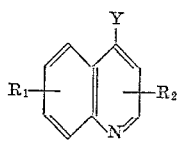

III wherein Y represents a reactive atom or group such as a chlorine atom or phenoxy group and $R_1$ and $R_2$ have the meanings hereinbefore assigned to them. This reaction may be carried out with or without a solvent in the presence or absence of a condensing agent. Preferably the reaction is carried out by heating to about 120–150° C. in the presence of an organic solvent of high boiling point, such as an aromatic hydrocarbon (e.g. xylene), an amide (e.g. dimethylformamide) or phenol.

(b) By reaction of a heterocyclic compound of the Formula IV:

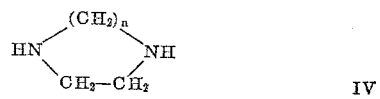

IV (wherein the carbon atoms may carry one or more alkyl groups and $n$ has the meaning assigned to it above) with a quinoline derivative of Formula V:

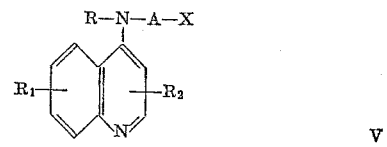

V wherein R represents a hydrogen atom or a protective group for the amino group which can subsequently be easily removed, such as an alkanoyl group preferably containing 1 to 4 carbon atoms, or a benzoyl or benzyl group, X represents a reactive ester residue such as a halogen atom or a sulphuric or sulphonic ester residue, for example a methanesulphonyloxy, benzenesulphonyloxy or toluene-p-sulphonyloxy group, and A, $R_1$ and $R_2$ are as hereinbefore defined. The condensation may advantageously be carried out in an organic solvent such as an aromatic hydrocarbon (e.g. toluene), an amide (e.g. dimethylformamide) or a sulphoxide (e.g. dimethylsulphoxide). The group protecting the nitrogen atom may then be removed by any method known per se for the removal of such a protective group.

(c) By reaction of a compound of Formula VI:

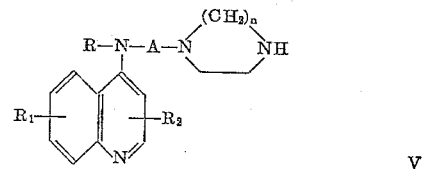

V with a compound of Formula V given above. After condensation, the group protecting the nitrogen atom of the amino group may be removed by any method known per se for the removal of such a protective group.

This reaction is advantageously carried out in an organic solvent, e.g. an aromatic hydrocarbon or ketone, in the presence of a condensing agent, e.g. an alkali metal derivative or tertiary amine. The reaction is preferably carried out at the boiling point of the solvent.

The compounds of Formula I may be converted into addition salts with acids by methods known per se. Thus, they may be prepared by reaction of an acid with a compound of Formula I in an appropriate solvent, such as an alcohol, an ether, a ketone or water. The salt formed precipitates, if necessary after concentration of the solution, and may be separated by filtration or decanting.

According to one specific aspect of the invention, there are provided piperazine compounds of the aforesaid Formula I wherein $n$ is 2, $R_1$ is a 7-chloro substituent and $R_2$ is hydrogen, the groups A having the meanings hereinbefore assigned. These are accordingly compounds of the Formula VII:

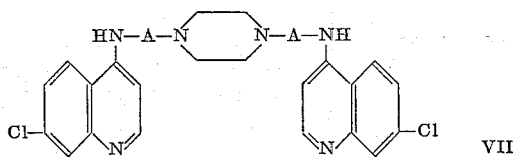

wherein one or more carbon atoms of the piperazine nucleus may carry an alkyl group containing up to four carbon atoms, and their acid addition salts. When the piperazine derivative is one in which the hydrocarbon group A contains an asymmetric carbon atom, the compound can exist in two optically inactive stereoisomeric forms which are referred to hereinafter as "form A" and "form B" without specifying the actual structural configuration of each stereoisomeric form. It is to be understood that the invention includes all the isomeric forms of compounds of Formula VII including the said two stereoisomeric forms and mixtures thereof.

According to a feature of the present invention, the new piperazine derivatives of general Formula VII are prepared by reacting a 1,4-bis(aminoalkyl)piperazine of the Formula VIII:

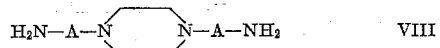

(wherein A is as hereinbefore defined, and one or more carbon atoms of the piperazine nucleus may carry an alkyl group containing up to four carbon atoms) with two moles of a 7-chloroquinoline substituted in the 4-position by an atom or group capabl eof reacting with an amino group of the piperazine starting material of Formula II to introduce the 7-chloroquinolyl radical. The reactive atom or group in the 4-position of the 7-chloroquinoline reactant is advantageously a halogen atom or a phenoxy group, preferred reactants being 4,7-dichloroquinoline and 7-chloro-4-phenoxyquinoline. This reaction may be carried out with or without an inert organic solvent in the presence or absence of a condensing agent, and is preferably effected by heating the reactants to a temperature between 120° and 250° C. in the presence of an inert organic solvent of high boiling point such as an aromatic hydrocarbon (for example xylene), an amide (for example dimethylformamide), or phenol.

The piperazine starting materials of general Formula VIII may be prepared by various methods such as the following:

(a) Condensation of chloroketone or chloroaldehyde with a piperazine followed by conversion of the compound obtained into an oxime and reduction of the oxime (or reductive amination of the intermediate carbonyl compound). This method of preparation is shown by the reaction scheme:

In these formulae $A_1$ represents a hydrogen atom or an alkyl group and $A_2$ represents an alkylene group, and are such that in each grouping $A_1$—CH(NH$_2$)—$A_2$— there are 2 to 6 carbon atoms.

(b) Condensation of a hydroxy ester with a piperazine followed by halogenation and amination of the product by the application of known methods. This method of preparation is illustrated by the reaction scheme:

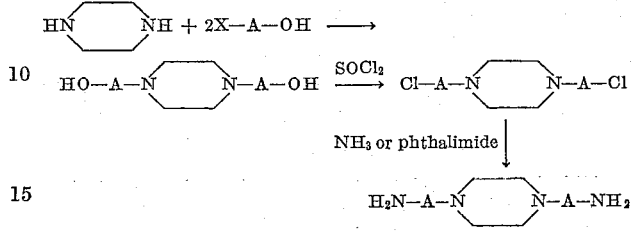

In these formulae A is as hereinbefore defined, and X represents the acid residue of a reactive ester, such as a halogen atom or a sulphuric ester group or a sulphonic ester group such as a methanesulphonyloxy, benzenesulphonyloxy or toluene-p-sulphonyloxy group.

A variant of this method is the condensation of a dibromoalkane or chlorobromoalkane with a piperazine followed by amination of the bis(halogenalkyl)piperazine obtained.

(c) condensation of a piperazine with an N-halogenoalkylphthalimide followed by hydrolysis, according to the following reaction scheme:

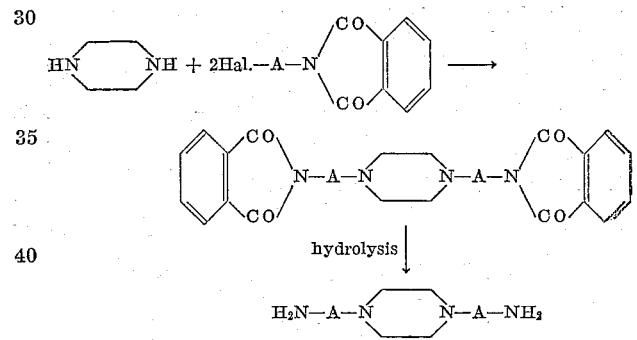

wherein Hal represents a halogen atom, and A is as hereinbefore defined.

(d) In the case of 1,4-bis(3-amino-1-propyl)piperazine, condensation of a piperazine with acrylonitrile followed by reduction:

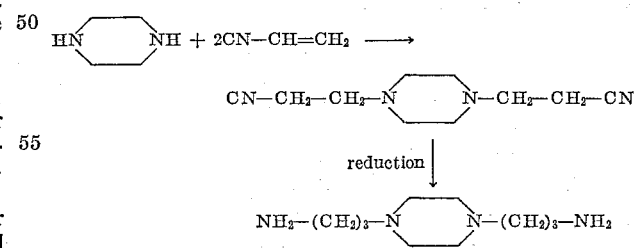

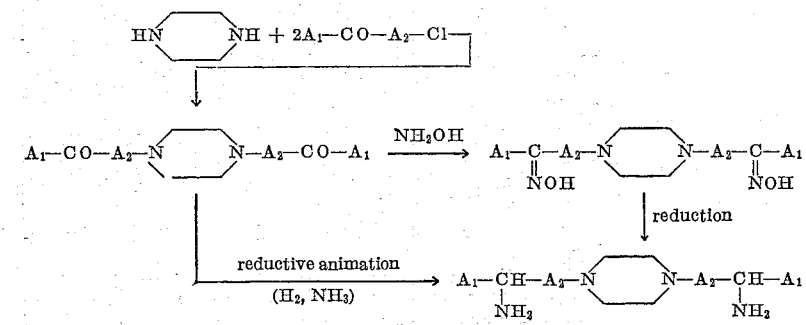

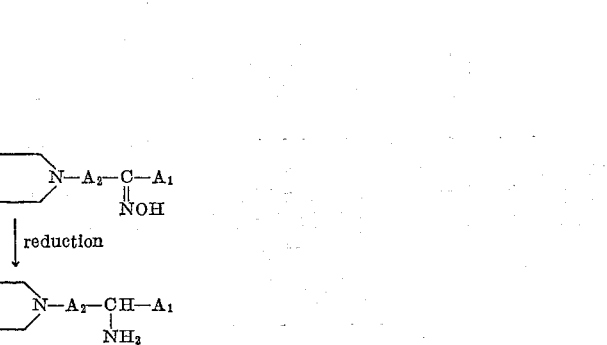

(e) Condensation of a cyano ester with a piperazine followed by reduction, according to the reaction scheme:

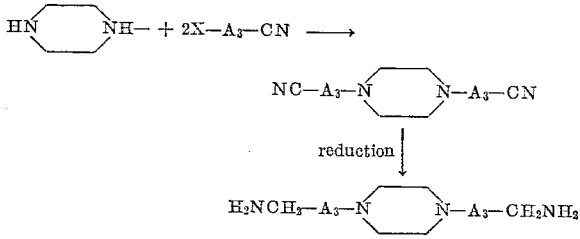

In these formulae $A_3$ is such that the group $-CH_2-A_3-$ is identical to A as hereinbefore defined, and X is as hereinbefore defined.

(f) A variation on method (a) consisting of formation of the oxime of a chloroketone or chloroaldehyde, and reduction of the oxime before condensation with a piperazine. The reaction scheme is as follows:

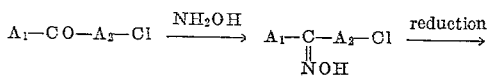

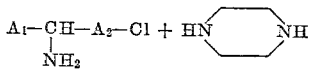

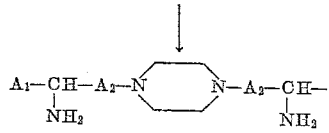

$A_1$ and $A_2$ being as hereinbefore defined.

(g) Another variation on method (a) consisting of the reaction of an aldehyde or ketone with a piperazine in the presence of formaldehyde (Mannich reaction) and conversion to the oxime of the carbonyl-containing intermediate, followed by reduction, for example:

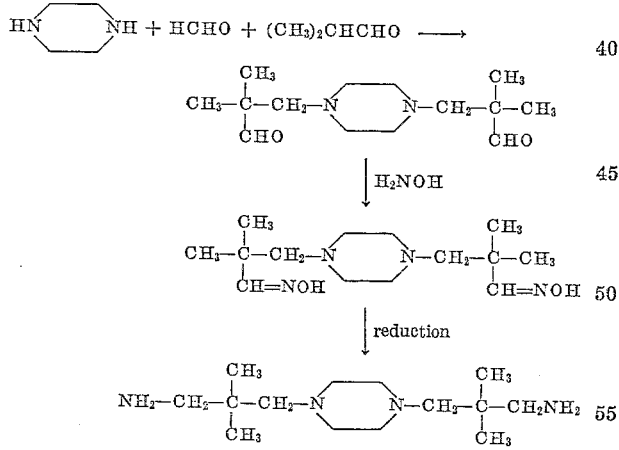

According to another feature of the invention, the piperazine derivatives of general Formula VII are prepared by reacting piperazine which may be substituted on one or more carbon atoms by an alkyl group containing up to four carbon atoms, with two moles of a quinoline derivative of the general Formula IX:

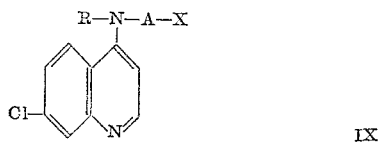

(wherein A and X are as hereinbefore defined, and R represents a hydrogen atom or a group which is readily removable protecting the amino group during the reaction, such as a lower alkanoyl, benzoyl or benzyl group) and, when R is a protecting group, subsequently removing the group in manner known per se from the resultant product. The reaction can be carried out advantageously in an inert organic solvent such as an aromatic hydrocarbon (e.g. toluene), an amide (e.g. dimethylformamide) or a sulphoxide (e.g. dimethylsulphoxide).

The compounds of Formula IX may be prepared by methods analogous with those described in the literature: R. Elderfield et coll., J. Amer. Chem. Soc. 68, 1250 (1946), and M. Carmack et coll., J. Amer. Chem. Soc. 68, 1220 (1946). The general reaction scheme is as follows:

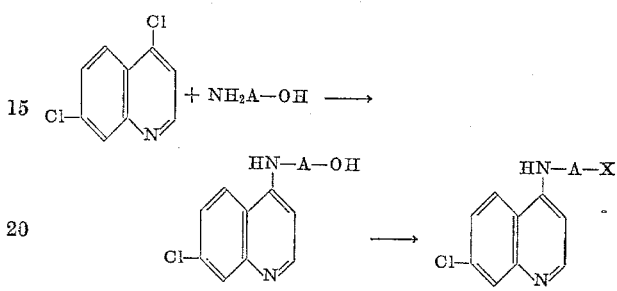

symbols A and X being as hereinbefore defined.

When R in Formula IX represents an acyl group, the following reaction scheme for preparing the required starting materials may be followed:

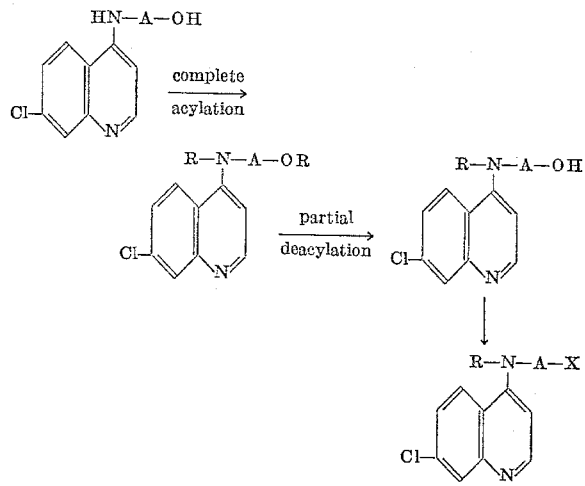

wherein the R symbols represent acyl groups, and A and X are as hereinbefore defined.

According to a still further feature of the invention, the piperazine derivatives of general Formula VII are prepared by reacting a compound of the general Formula X:

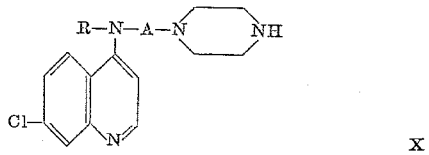

(wherein A and X are as hereinbefore defined, the symbol R represents a hydrogen atom or a group which is readily removable protecting the amino group during the reaction, and one or more of the carbon atoms of the piperazine nucleus may carry an alkyl group containing up to four carbon atoms) with a quinoline derivative of general Formula IX and, when R is a protecting group, removing the group in manner known per se from the resultant product. The reaction is advantageously carried out in an inert organic solvent from the class consisting of aromatic hydrocarbons and ketones in the presence of a condensing agent such as an alkali metal or a tertiary amine. Advantageously the reaction is carried out at the boiling point of the solvent employed.

The compounds of general Formula X can be prepared in two ways:

(a) Reaction of 4,7-dichloroquinoline with a compound of the formula:

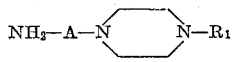

$R_1$ being a protecting group (in particular a carbethoxy or acyl group) which is subsequently removed, the reaction scheme in which A and $R_1$ are as hereinbefore defined being

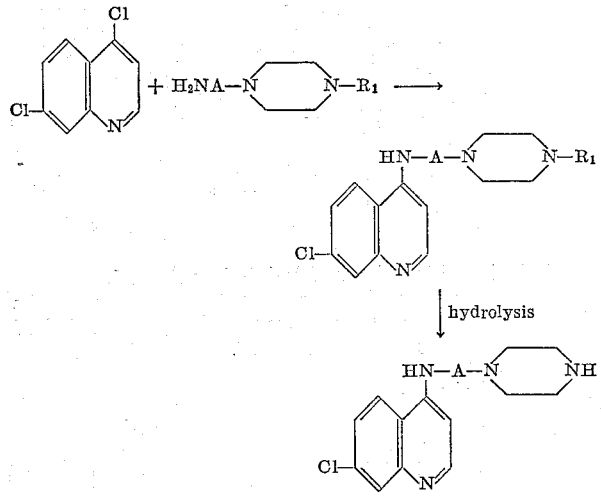

If a compound of Formula X is required as starting material in which R is a protecting group, e.g. acetyl, the group is introduced before the last step of hydrolysis of the terminal group $R_1$, which is selective.

(b) Reaction of an excess of a piperazine with a compound of Formula IX.

In the aforementioned processes, when the hydrocarbon group A contains an asymmetric carbon atom, the optically inactive stereoisomeric forms A and B are generally formed simultaneously during the reaction: when so formed they may be separated in manner known per se, such as by fractional crystallization or chromatography.

The new piperazine derivatives of Formula VII may be converted by known methods into acid addition salts. Thus, the acid addition salts may be obtained by the action of an acid on the piperazine derivative in an appropriate solvent such as an alcohol, an ether, a ketone, or water. The acid addition salt which is formed is precipitated, if necessary after concentration of its solution, and is separated by filtration or decantation.

In this specification the term "known methods" means methods heretofore used or described in the chemical literature.

The new piperazine derivatives of the present invention and their non-toxic acid addition salts possess useful pharmacodynamic properties. They are, in particular, useful as anti-inflammatories and antirheumatics, and are also useful as antimalarials, anthelmintics and amoebicides. Of outstanding importance are those piperazine derivatives wherein the grouping

represents

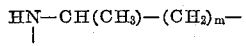

where $m$ is an integer from 1 to 4 or

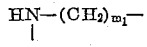

where $m_1$ is an integer from 2 to 6, or

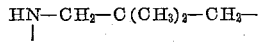

in particular 1,4-bis[4-(7-chloro-4-quinolylamino)pentyl]-piperazine, 1,4 - bis[4 - (7-chloro-4-quinolylamino)-pentyl]-2,5-dimethylpiperazine, 1,4-bis[3-(7-chloro-4-quinolylamino) - butyl]piperazine, 1,4 - bis[3-(7-chloro-4-quinolylamino)propyl]piperazine, 1,4-bis[2-(7-chloro-4-quinolylamino)propyl]piperazine, 1,4-bis[5-(7-chloro-4-quinolylamino)pentyl]piperazine, 1,4-bis[5-(7-chloro-4 - quinolylamino)hexyl]piperazine, 1,4 - bis[3-(7-chloro-4-quinolylamino)-2,2-dimethyl - propyl]piperazine, 1,4 - bis[3-(7-chloro-4-quinolylamino)propyl]-2,5 - dimethylpiperazine, 1,4 - bis[3 - (7 - chloro-4-quinolylamino)propyl]-2-methyl - piperazine and 1,4 - bis[2-(7-chloro-4-quinolylamino)ethyl]piperazine, and their non-toxic acid addition salts. Of the aforesaid compounds 1,4-bis[4-(7-chloro-4-quinolylamino)pentyl]piperazine, form A, and 1,4 - bis[3-(7-chloro-4-quinolylamino)propyl]piperazine are outstanding as anti-inflammatories and 1,4-bis[2-(7-chloro - 4 - quinolylamino)propyl] - piperazine, 1 - [2 - 7-chloro - 4 - quinolylamino)propyl]-4-[2-(6-chloro-4-quinolylamino)propyl]piperazine and 1-[2-(7-chloro-4-quinolylamino) - propyl] - 4 - [2-(7-chloro-4-quinolyl)aminoethyl]piperazine are outstanding as antimalarials.

For therapeutic purposes, the bases of general Formula I or VII are preferably employed as such or in the form of non-toxic acid addition salts, i.e. salts containing anions which are relatively innocuous to the animal organism in therapeutic doses of the salts (such as hydrochlorides and other hydrohalides, phosphates, nitrates, sulphates, acetates, propionates, succinates, benzoates, fumarates, maleates, citrates, tartrates, theophyllinates, theophyllinacetates, salicylates, phenolphthalinates, methanesulphonates, ethanedisulphonates, and methylene-bis-β-hydroxy-naphthoates) so that the beneficial physiological properties inherent in the bases are not vitiated by side effects ascribable to the anions.

The following examples illustrate the invention.

*Example I*

A mixture of 1,4-bis(4-aminopentyl)piperazine (15.95 g.), 4,7-dichloroquinoline (24.55 g.) and recrystallised phenol (90 g.) is heated for four hours at about 190° C. with stirring. After being allowed to cool for 18 hours while being stirred, the reaction mixture obtained is poured into a solution prepared from sodium hydroxide solution (135 cc.; d.=1.33) and distilled water (900 cc.). The base which is thus liberated is extracted with chloroform (150 cc. and 2 x 100 cc.). The chloroform solution is washed with distilled water (100 cc.), dried over anhydrous sodium sulphate and filtered. The chloroform is then removed on the water-bath, leaving an orange-red oil from which a yellow solid precipitates. 1,4-bis[4-(7-chloro-4-quinolylamino)pentyl]piperazine (13.5 g.), M.P. about 125° C.—a mixture of forms A and B—is obtained in the form of a yellow crystalline powder. By the action of ethereal hydrogen chloride on the aforesaid base dissolved in acetone, there is obtained the corresponding hydrochloride, M.P. about 260° C.

1,4-bis(4-aminopentyl)piperazine employed as starting material may be obtained as follows:

By the action of 1-bromo-pentan-4-one (132 g.) on anhydrous piperazine (34.5 g.) in triethylamine (81 g.) there is obtained 1,4-bis(4-oxopentyl)piperazine (40.2 g.), B.P. 162–170° C., 0.3/mm. Hg. On addition of hydroxylamine hydrochloride (43.9 g.) 1,4-bis(4-oximinopentyl) piperazine (38.2 g.), M.P. 187–189° C., is obtained. Reduction of the oximino compound in the presence of Raney nickel gives 1,4-bis(4-aminopentyl)piperazine (23.12 g.) in the form of an oil, B.P. 145–155° C./0.2 mm. Hg.

*Example II*

1,4-bis(4-aminopentyl)piperazine (216 g.), 4,7-dichloroquinoline (333 g.), crystalline phenol (1,210 g.) and ammonium chloride (3.4 g.) are heated at 180° C. with stirring for four hours. After cooling, the thick liquid is poured into 2 N sodium hydroxide solution (10 litres) and the mixture stirred with chloroform (3.5 litres). After standing, the chloroform layer is decanted, washed with water (4 litres) and then stirred with N hydrochloric acid (5 litres). After decanting, the hydrochloric solution is separated, treated with decolouring charcoal (50 g.), filtered and made alkaline with N sodium hydroxide solution (5 litres), giving a gummy product. This gum is extracted with boiling toluene (5.5 litres) and, after the azeotropic removal of a small quantity of water, the hot toluene solution is treated with decolourising charcoal, filtered and allowed to crystallise. The extraction is repeated twice with the same quantity of boiling solvent. The crystals recovered in the successive extractions are combined and recrystallised from acetonitrile (7.2 litres) giving a mixture of forms A and B of 1,4-bis[4-(7-chloro-4-quinolylamino)pentyl]piperazine (75.1 g.), M.P. 160–162° C. This product may be converted into a hydrated product by the following method:

The product melting at 160–162° C. (48.9 g.) is dissolved in 0.5 N hydrochloric acid (840 cc.). N sodium hydroxide solution (420 cc.) is then added to the solution obtained and the product which precipitates is separated, washed and dried at 20° C./0.2 mm. Hg. A hydrated product is obtained, M.P. about 125° C. (49 g. corresponding to 46.9 g. of anhydrous compound).

The hydrated product can be converted to the crystalline anhydrous form, M.P. 160–162° C., by azeotropic dehydration with toluene and recrystallisation from acetonitrile.

*Example III*

4-(5-chloro-2-pentyl)amino-7-chloroquinoline (169 g.), 4 - (5 - 1' - piperazinyl-2-pentyl)amino-7-chloroquinoline (196 g.), pure anhydrous sodium iodide (88.5 g.) and methyl ethyl ketone (1600 cc.) are heated to 80° C. with stirring. After refluxing for eight hours, the solvent is distilled off and the residue, after being allowed to cool, is then treated with distilled water (1400 cc.), sodium hydroxide solution (70 cc.; d.=1.33) and chloroform (2 litres). After stirring and allowing the components to separate, the chloroform layer is separated off, washed with distilled water (1 litre) and then stirred with hydrochloric acid (1500 cc.; 3.5%). After separating, the hydrochloric solution is made alkaline with sodium hydroxide solution (500 cc.; d.=1.33). The separated base is extracted with chloroform (1500 cc.) and the chloroform solution is clarified by filtering through anhydrous sodium sulphate and evaported to dryness in vacuo. The residue obtained is treated with boiling toluene (3500 cc.) and, after distilling off a portion of the solvent to remove azeotropically a small quantity of water, the hot toluene solution is filtered through decolourising charcoal and allowed to crystallise. The product obtained a recrystallised from acetonitrile (3200 cc.) giving a mixture of forms A and B of 1,4-bis[4-(7-chloro-4-quinolylamino)pentyl]piperazine (88 g.), M.P. 160–162° C. The maleate of this base melts at 125–130° C. after crystallisation from ethanol.

4 - (5 - 1'-piperazinyl-2-pentyl)amino-7-chloroquinoline (226 g.), M.P. about 125° C., is obtained by the action of anhydrous piperazine (374 g.) in methyl ethyl ketone (2600 cc.) and in the presence of sodium iodide (130 g.) on 4-(5-chloro-2-pentyl)amino-7-chloroquinoline (246 g.), itself obtained according to M. Carmack et coll., J. Amer. Chem. Soc. 68, 1220 (1946).

*Example IV*

Proceeding as in Example II, but commencing with 1,4-bis-(4-aminopentyl)-2,5-dimethylpiperazine (70 g.), 4,7-dichloroquinoline (95 g.), crystalline phenol (350 g.) and ammonium chloride (1 g.), 1,4-bis[4-(7-chloro-4-quinolylamino)pentyl]-2,5-dimethylpiperazine (15.2 g.), M.P. 187° C., is obtained.

1,4-bis(4-aminopentyl) - 2,5 - dimethylpiperazine employed as starting material is obtained in the same manner as for 1,4-bis(4-aminopentyl)piperazine in Example I. Starting from trans 2,5-dimethylpiperazine (114 g.) and 1-bromo-pentan-4-one (330 g.), there is obtained 1,4-bis(4 - oxopentyl) - 2,5 - dimethylpiperazine (170 g.), B.P. 105–115° C./0.1 mm. Hg. Addition of hydroxylamine hydrochloride (165 g.) gives 1,4-bis(4-oximinopentyl)-2,5-dimethylpiperazine (159 g.), M.P. 192–193° C. On reduction of this oximino compound in the presence of Raney nickel there is obtained crude 1,4-bis(4-aminopentyl)-2,5-dimethylpiperazine (138.8 g.) which is employed as such.

*Example V*

Proceeding as in Example II, but commencing with 1,4-bis(3-aminobutyl)piperazine (43 g.), 4,7-dichloroquinoline (71 g.), crystalline phenol (260 g.) and ammonium chloride (1 g.), 1,4-bis[3-(7-chloro-4-quinolylamino)butyl]piperazine (11.8 g.), M.P. 268° C., is obtained.

By the Mannich reaction between anhydrous piperazine (258 g.), acetone (1740 g.), and formaldehyde (600 g.) in 12 N hydrochloric acid (490 cc.), there is obtained 1,4-bis(3-oxobutyl)piperazine (178 g.), B.P. 91–112° C./0.1 mm. Hg. Addition of hydroxylamine hydrochloride (208.5 g.) to the oxobutyl compound gives 1,4-bis(3-oximinobutyl)-piperazine (137 g.) melting at about 215° C. after recrystallisation from dimethylformamide. On reduction of the recrystallised oximino product (70 g.) in the presence of Raney nickel there is obtained crude 1,4-bis(3-aminobutyl)piperazine (45 g.) which is employed as starting material in this example.

*Example VI*

1,4-bis(3-aminopropyl)piperazine (50 g.), 4,7-dichloroquinoline (99 g.), crystalline phenol (360 g.) and ammonium chloride (1 g.) are heated at 175° C. with stirring for four hours. After cooling, the reaction mixture is poured into sodium hydroxide solution (4.2 litres; 13%). The liberated base crystallises giving a product (111 g.), M.P. 238–240° C., which can be purified by dissolving the crude product (35 g.) in dimethylformamide (400 cc.) at about 100° C. On cooling, 1,4-bis[3-(7-chloro-4-quinolylamino)propyl]piperazine (26.1 g.), M.P. 240–242° C., is obtained.

1,4-bis(3-aminopropyl)piperazine (50 g.), B.P. 131–136° C./0.05 mm. Hg employed as starting material is obtained by the condensation of acrylonitrile (35 g.) on piperazine (29 g.) followed by the reduction in the presence of Raney nickel of the resultant 1,4-bis(2-cyanoethyl)piperazine.

*Example VII*

1,4-bis(4-aminopentyl)piperazine (25.6 g.), 4,7-dichloroquinoline (99 g.) and hydrochloric acid (1 cc.; d.=1.19) are heated at 150° C. with stirring for four hours. After cooling, the reaction mixture is treated with chloroform (300 cc.) and hydrochloric acid (200 cc.; 3.5%). After stirring and separation of the layers, the aqueous hydrochloric layer is made alkaline with sodium hydroxide solution (80 cc.; d.=1.33). The liberated organic base is extracted with chloroform (400 cc.). The chloroform is distilled off and the residue dissolved in boiling toluene (1500 cc.). Toluene (100 cc.) is distilled off to remove a small quantity of water azeotropically, decolourising charcoal (5 g.) added and the solution filtered hot. The product which separates on cooling gives, after recrystallisation from acetonitrile (500 cc.), a mixture of forms A and B of 1,4-bis[4-(7-chloro-4-quinolylamino)pentyl] piperazine (12.9 g.), M.P. 160–162° C.

*Example VIII*

Proceeding as in Example II, but commencing with 1,4-bis(2-aminopropyl)piperazine (32 g.), 4,7-dichloroquinoline (63.4 g.), crystalline phenol (215 g.) and ammonium chloride (0.15 g.), 1,4-bis-[2-(7-chloro-4-quinolylamino)propyl]piperazine (34 g.), M.P. 260° C., is obtained.

To anhydrous piperazine (43 g.) in ethanol there is added the oxime of chloroacetone (106 g.) prepared according to R. Scholl and G. Matthaiopoulos, Ber. 29, 1552 (1896). There is thus obtained 1,4-bis(2-oximinopropyl)piperazine (47 g.), M.P. 286–287° C., which on reduction in the presence of Raney nickel gives the starting material 1,4-bis(2-aminopropyl)piperazine (40 g.) in the form of an oil, B.P. 100° C./0.2 mm. Hg.

*Example IX*

Proceeding as in Example II but commencing with 1,4-bis(5-aminopentyl)piperazine (12 g.), 4,7-dichloroquinoline (18.6 g.), crystalline phenol (52 g.) and ammonium chloride (0.2 g.), a product (22.2 g.) is obtained which, after recrystallisation from dimethylformamide (100 cc.), gives 1,4 - bis[5 - (7 - chloro-4-quinolylamino)pentyl]piperazine (18.9 g.), M.P. 160–162° C.

The piperazine starting material may be prepared as follows:

To potassium phthalimide (185 g.) there is added 1,5-dibromopentane (685 g.). The resultant N-(5-bromopentyl)phthalimide (155 g.) is condensed with anhydrous piperazine (22.5 g.), and the 1,4-bis(5-phthalimidopentyl)piperazine (42 g.), M.P. 158–159° C. after crystallisation from ethanol, thus obtained is hydrolysed with concentrated hydrochloric acid (130 cc.; d.=1.19) to give 1,4-bis(5-aminopentyl)piperazine (13 g.).

*Example X*

A mixture of 4,7-dichloroquinoline (1268 g.), 1,4-bis(4-aminopentyl)piperazine (820 g.) and phenol (1203 g.) is heated for 24 hours at 125° C. The viscous oil obtained is poured at about 80° C. into a solution of 10 N sodium hydroxide solution (2.55 litres) and distilled water (8 litres). The crude base which separates is extracted with chloroform (12 litres in all). The chloroform extract is washed with distilled water (2 x 12 litres in all) and then dried over anhydrous sodium sulphate (300 g.). The chloroform is removed on a water-bath and the residue taken up in methylene chloride (20 litres). The solution obtained is chromatographed through an alumina column (20 kg.) 16 cm. in diameter and 160 cm. high. Elution is then effected with methylene chloride (50 litres). The solvent of the eluate is driven off on the water-bath giving a dry extract (1065 g.) which is dissolved with stirring in boiling methyl ethyl ketone (1200 cc.). The solution obtained is allowed to stand in a refrigerator for 16 hours. After filtration, the residue is washed on the filter with methyl ethyl ketone (1200 cc.) and dried for 16 hours at 40° C. under reduced pressure (20 mm. Hg) giving a product (575 g.), M.P. 160–162° C., which is dissolved in a boiling mixture of ethanol (2 litres) and distilled water (875 cc.), treated with decolourising charcoal (30 g.), filtered hot and then allowed to cool to room temperature without disturbance. After 16 hours, the solution is filtered and the filtrate washed with a mixture of ethanol (2100 cc.) and distilled water (900 cc.). The moist filter-cake is placed in a 6-litre three-necked flask with toluene (4 litres) and completely dehydrated by distilling off a quantity of toluene (2 litres). The toluene solution is cooled with stirring and a product crystallises. After filtration and washing with toluene (400 cc.), a damp product (516 g.) is obtained which is dissolved in boiling methyl ethyl ketone (8 litres). Decolourising charcoal (30 g.) is added to the solution which is then filtered hot and the filtrate cooled in a refrigerator. After standing for 16 hours and filtration, the residue is washed with methyl ethyl ketone (600 cc.) giving a damp product (324 g.), a sample of which melts at 170–172° C. after drying. The damp product obtained is extracted with boiling methyl ethyl ketone (4500 cc.). Insoluble material is removed by filtering hot, washed with methyl ethyl ketone (200 cc.) and dried for 16 hours at 50° C. under reduced pressure (20 mm. Hg) giving 1,4-bis[4-(7-chloro-4-quinolylamino)pentyl]piperazine (form B) (54 g.), M.P. 184–186° C. The filtrate is cooled and stirred for 48 hours at room temperature. After filtration the product is washed with methyl ethyl ketone (600 cc.) and dried for 20 hours at 50° C. under reduced pressure (20 mm. Hg) giving 1,4-bis[4-(7-chloro-4-quinolylamino)pentyl]piperazine (form A) (149 g.), M.P. 174–176° C.

By concentration of the mother liquors, a further crop of 1,4-bis[4-(7-chloro-4-quinolylamino)pentyl]piperazine (form A) (32 g.), M.P. 174–176° C., is obtained.

*Example XI*

A mixture of 1,4-bis(5-aminohexyl)piperazine (20 g.), 7-chloro-4-phenoxyquinoline hydrochloride (45 g.) and dimethylformamide (50 cc.) is heated for 17 hours at 140° C. The reaction product is run into a solution of 10 N sodium hydroxide (50 cc.) in water (500 cc.) and the mixture is then agitated with methylene chloride (900 cc.). The organic layer is decanted and the solution obtained is treated with methanesulphonic acid (49 g.) diluted with water (400 cc.). After agitation and decanting, the aqueous layer is separated, made alkaline with 10 N sodium hydroxide (50 cc.), diluted with distilled water (45 cc.) and finally extracted twice with chloroform (total 500 cc.). The combined chloroform extracts are chromatographed through a column of alumina (500 g.) and eluted with chloroform (800 cc.). The eluates are taken to dryness on a water-bath and the oily residue obtained is dissolved in boiling ethanol (10 cc.). Acetonitrile (80 cc.) is added and, after 16 hours in the refrigerator, the alkaline precipitate is separated. This product is dehydrated by azeotropic distillation with toluene, the final volume being taken to 150 cc. After 16 hours standing in the refrigerator, the crystalline precipitate obtained is separated and dried for 16 hours at 20° C. in vacuo (0.2 mm. Hg). 1,4-bis[5-(7-chloro-4-quinolylamino)hexyl]piperazine (6 g.) is obtained, M.P. 184–186° C.

The 1,4-bis(5-aminohexyl)piperazine starting material is obtained by the reduction with Adams' platinum of 1,4-bis(5-oximinohexyl)piperazine (22.5 g.), M.P. 177° C., itself prepared by the action of hydroxylamine hydrochloride (41 g.) upon 1,4-bis(5-oxohexyl)piperazine. The last-mentioned compound is obtained by the condensation of piperazine (12.7 g.) with 6-bromohexan-2-one (56 g.) prepared according to Anderson et coll., J. Amer. Chem. Soc., 68, 1294 (1946).

The 4-phenoxy-7-chloroquinoline starting material is prepared by the method of A. Surrey and R. Cutler, J. Amer. Chem. Soc., 73, 2623 (1951).

*Example XII*

A mixture of 1,4-bis(3-amino-2,2,-dimethylpropyl)piperazine (45 g.), phenol (300 g.), 4,7-dichloroquinoline (79 g.) and ammonium chloride (2 g.) is heated for 4 hours at 180° C. The thick oil obtained is cooled to 80° C. and poured into a solution of 10 N sodium hydroxide (500 cc.) in distilled water (1450 cc.). The basic product which separates is extracted twice with methylene chloride (total 2 litres). The combined extracts are first washed with a 10 N solution of sodium hydroxide (100 cc.) in distilled water (1000 cc.) and then with distilled water (1000 cc.). The solution obtained is agitated with methanesulphonic acid (77 g.) in distilled water (720 cc.). After decantation the aqueous layer is treated with decolourising charcoal (20 g.) and filtered. The filtrate is made alkaline with a solution of 10 N sodium hydroxide (90 cc.) in distilled water (50 cc.). The crude base which precipitates is separated, washed on the filter with methanol (100 cc.) and then dissolved in boiling chloroform (70 cc.). On the addition of ethyl acetate (250 cc.) the base crystallises. After cooling, the base is separated, washed on the filter with ethyl acetate and dried at 70° C. in vacuo (0.2 mm. Hg) for 16 hours. 1,4-bis[3-(7-chloro- 4-quinolylamino)-2,2-dimethylpropyl]piperazine (24.5 g.) is obtained, M.P. 252° C.

The 1,4-bis(3 - amino-2,2-dimethylpropyl)piperazine (202 g.) starting material in this preparation is obtained by the reduction with Adams' platinum of 1,4-bis(3-oximino-2,2-dimethylpropyl)piperazine (236 g.), M.P. 162–163° C. The latter product is synthesised from 1,4-bis(2-formyl-2-methylpropyl)piperazine (244 g.), M.P. 98–99° C., itself obtained by the Mannich reaction between isobutyraldehyde (260 g.), formaldehyde (225 g.) and piperazine (129 g.).

*Example XIII*

A mixture of 1,4-bis(3-aminopropyl)-2,5-dimethylpiperazine (34 g.), 4,7-dichloroquinoline (59 g.), phenol (165 g.) and ammonium chloride (0.6 g.) is heated for 4 hours at 180° C. The thick oil obtained is poured at about 80° C. into a cold solution of 10 N sodium hydroxide (350 cc.) in distilled water (1500 cc.). The base which separates at first as an oil crystallises gradually on agitation. The crystalline precipitate obtained is filtered off after 16 hours agitation at 20° C. It is washed on the filter with distilled water (total 2500 cc.) and is then dried for 5 hours at 50° C. under reduced pressure (20 mm. Hg). The crude dry base is dissolved in dimethylformamide (500 cc.), the temperature being raised to 120° C., decolourising charcoal (2 g.) is added and the mixture is filtered while hot. On cooling, the base crystallises from the filtrate and is separated and washed with dimethylformamide (total 100 cc.). This base is recrystallised from dimethylformamide (400 cc.), separated, washed with dimethylformamide (100 cc.) and dried at 50° C. under reduced pressure (20 mm. Hg) for 60 hours. 1,4-bis[3-(7-chloro-4-quinolylamino)propyl] - 2,5 - dimethylpiperazine (53 g.), M.P. 242–243° C., is obtained.

1,4 - bis(3-aminopropyl)-2,5-dimethylpiperazine (54.5 g.) (M.P. 69–71° C., B.P. 145–146° C./0.1 mm. Hg) used as starting material for this preparation is obtained by reduction of 1,4-bis(2-cyanoethyl)-2,5-piperazine (79 g.), M.P. 146–147° C., itself prepared by the condensation of acrylonitrile (53.5 g.) with trans 2,5-dimethylpiperazine (57.5 g.).

*Example XIV*

A mixture of 1,4-bis(3-aminopropyl)-2-methylpiperazine (23 g.), 4,7-dichloroquinoline (39.6 g.), phenol (110 g.) and ammonium chloride (0.4 g.) is heated at 180° C. for 4 hours. The reaction mixture is treated as described in Example XIII to obtain 1,4-bis[3-(7-chloro-4-quinolylamino)propyl]-2-methylpiperazine (17.1 g.), M.P. 184–185° C.

1,4-bis(3-aminopropyl)-2-methylpiperazine (27 g.), an oil B.P. 110–112° C./0.1 mm. Hg, used in this preparation is obtained by reduction of 1,4-bis(2-cyanoethyl)-2-methylpiperazine (40 g.) itself prepared by the condensation of acrylonitrile (21.2 g.) with 2-methylpiperazine (20 g.).

*Example XV*

A mixture of 4-N-(5-1'-piperazinyl-2-pentyl)acetylamino-7-chloroquinoline (4.6 g.), 4-N-(5-methanesulphonyloxy-2-pentyl)acetylamino-7-chloroquinoline (5 g.) and triethylamine (2.5 g.) in anhydrous toluene (100 cc.) is heated under reflux for 20 hours. After cooling to room temperature, 2 N hydrochloric acid (100 cc.) is added and the mixture is agitated for 10 minutes. The toluene layer is decanted and the aqueous acid phase is made alkaline with 4 N sodium hydroxide (70 cc.) and extracted with methylene chloride (350 cc.). The organic phase is decanted, washed with distilled water and, after a second decantation, is dried over potassium carbonate. After evaporation of the solvent there remains a residue (7.2 g.) which is taken up in methylene chloride (120 cc.). This solution is purified by chromatography over a column of alumina (300 g.). After elution with methylene chloride and evaporation of the solvent there is obtained 1,4 - bis[4-N - (7-chloro-4-quinolyl)acetylaminopentyl]piperazine (5 g.) whose oxalate melts at 241–243° C. after crystallisation from methanol and hydrobromide melts at about 255° C. after crystallisation from acetone.

1,4 - bis[4-N-(7-chloro-4-quinolyl)acetylaminopentyl] piperazine hydrobromide (2.6 g.) is dissolved in a solution comprising ethylene glycol (200 cc.), distilled water (20 cc.) and 85% potassium hydroxide (4 g.). The mixture is heated under reflux for 15 hours and then poured into cold water (2 litres). A flocculent mass is formed and is separated and washed with water. This solid is dissolved in a mixture of ethanol (100 cc.) and benzene (600 cc.). After evaporation of these solvents, first at atmospheric pressure and then under reduced pressure (20 mm. Hg), a gum (1 g.) is obtained which is dissolved in methylene chloride (40 cc.). The solution obtained is chromatographed over a column of alumina (30 g.) and, after elution with methylene chloride and evaporation of the solvent, there is obtained 1,4-bis[4-(7-chloro-4-quinolylamino)pentyl]piperazine, form A (0.4 g.), which melts at 174° C. after recrystallisation from acetone.

The 4-N-(5-1'-piperazinyl-2-pentylacetylamino-7-chloroquinoline (32 g.), whose hydrobromide melts at 248–250° C., is prepared by heating for 9 hours under reflux a mixture of 4-N-(5-methanesulphonyloxy-2-pentyl)acetylamino-7-chloroquinoline (38.5 g.) and piperazine (43 g.) in anhydrous toluene (200 cc.).

The 4 - N-(5-methanesulphonyloxy-2-pentyl)acetylamino-7-chloroquinoline (38.5 g.) is prepared in benzene (350 cc.) in the presence of triethylamine (10.1 g.) by the action of methanesulphonyl chloride (11.5 g.) upon 4 - N - (5-hydroxy-2-pentyl)acetylamino-7-chloroquinoline (30.6 g.) itself obtained by the hydrolysis in 11.7 N aqueous alcoholic potash (108 cc.) of 4-N-(5-acetoxy-2-pentyl)acetylamino-7-chloroquinoline (43.5 g.) prepared by the action of boiling acetic anhydride (1800 cc.) upon 4-(5-hydroxy-2-pentylamino)-7-chloroquinoline (38.2 g.).

*Example XVI*

A mixture of triethylamine (5.6 g), 4-N-(5-methanesulphonyloxy - 2 - pentyl)acetylamino - 7-chloroquinoline (22.1 g.) and 4 - (5 - 1' - piperazinyl - 2-pentylamino)-7-chloroquinoline (18.7 g.) in ethanol (400 cc.) is heated under reflux for 10 hours. The solvent is evaporated and the residue is treated with 4 N sodium hydroxide (100 cc.) and then extracted with methylene chloride (200 cc.). The organic layer is decanted and the solvent is evaporated. There is thus obtained 1 - [4 - N - (7 - chloro - 4-quinolyl)acetylaminopenyl] - 4-[4-(7-chloro-4-quinolylamino)pentyl]-piperazine (47 g.) which is dissolved in a mixture of ethylene glycol (300 cc.), water (30 cc.) and 85% potassium hydroxide (31.5 g.). The reaction mixture is heated for 18 hours under reflux and then poured into cold distilled water (3 litres). A flocculent mass settles out, the supernatant solution is decanted and the residue is washed with water. The gum thus obtained is dissolved in a mixture of ethanol (500 cc.) and benzene (1000 cc.). After distillation of the solvents, at first under atmospheric pressure and then under reduced pressure (20 mm. Hg), a gummy residue (36 g.) remains which is crystallised from acetone (150 cc.). After separation and washing there is obtained crude 1,4-bis[4-(7-chloro-4-quinolylamino)pentyl]piperazine (21.4 g.), M.P. about 135° C., a mixture of the isomeric forms A and B.

The 4-(5-1'-piperazinyl-2-pentyl)amino-7-chloroquinoline starting material is prepared as described in Example III.

*Example XVII*

A mixture of 4-(2-chloroethylamino)-7-chloroquinoline (241 g.), ethanol (2000 cc.), anhydrous piperazine (38.6 g.), sodium iodide (150 g.) and anhydrous triethylamine (101 g.) is heated under reflux for 24 hours with mechanical agitation. After cooling, the precipitate is filtered off and washed with ethanol (100 cc.)

followed by distilled water (1000 cc.) and finally with ethanol (100 cc.). The product obtained is dissolved without drying in a solution of methanesulphonic acid (100 g.) in distilled water (1 litre), decolourising charcoal (20 g.) is added and the mixture is filtered. The base is reprecipitated from the filtrate by adding with agitation a solution of 10 N sodium hydroxide (110 cc.) in distilled water (100 cc.), separated and washed with distilled water (total 800 cc.) followed by ethanol (300 cc.). After drying for 16 hours at 60° C. (0.2 mm. Hg), there is obtained 1,4 - bis[2 - (7 - chloro-4-quinolylamino)ethyl]piperazine (85 g.), M.P. 270–271° C.

The 4-(2-chloroethyl)amino-7-chloroquinoline starting material is prepared according to R. Elderfield, J. Amer. Chem. Soc. 68, 1251 (1946).

*Example XVIII*

A mixture containing 4-N-(5-methanesulphonyloxy-2-pentyl)-acetylamino-7-chloroquinoline (16.7 g.), anhydrous piperazine (2.15 g.) and triethylamine (5 g.) in dimethylsulphoxide (100 cc.) is heated for 14 hours at 95° C. It is then poured into cold distilled water (1000 cc.) and extracted with methylene chloride (1000 cc.). The organic layer is treated with decolourising charcoal (10 g.), filtered and dried over sodium sulphate. The solvent is first evaporated under atmospheric pressure and then under reduced pressure (20 mm. Hg). The residue (14 g.) is taken up in methylene chloride (250 cc.) and the solution is chromatographed over a 25 cm. long column of alumina (420 g.). After elution with methylene chloride (3 litres), the solvent is evaporated under reduced pressure and a residual oil (9.8 g.) is obtained which is taken up in methanol (200 cc.). After treatment of this solution with decolourising charcoal (0.2 g.), filtration and evaporation of the solvent under reduced pressure (20 mm. Hg), there is obtained crude 1,4-bis[4-N - (7 - chloro-4-quinolyl)acetylaminopentyl]-piperazine (8.6 g.) which is purified as follows:

The crude product (8.6 g.) is dissolved in methanol (80 cc.) and after filtration of the solution obtained, oxalic acid (2.32 g.) in methanol (30 cc.) is added. After agitation a solid crystallises and is separated and the solid obtained dried. There remains 1,4-bis[4-N-(7-chloro-4-quinolyl)acetylaminopentyl]piperazine oxalate (9.3 g.), M.P. 241° C.

Deacetylation is effected as described in Example XV in the case of the hydrobromide. There is thus obtained 1,4 - bis[4 - (7-chloro-4-quinolylamino)pentyl]piperazine (form A), M.P. 174° C.

*Example XIX*

4-chloroquinoline (16.3 g.) [prepared according to C. Houser and G. Reynolds, J. Org. Chem. 15, 1229 (1950)] is heated at 175° C., with stirring, for 5 hours with 1,4-bis-(3-aminopropyl)piperazine (10 g.), phenol (55 g.) and ammonium chloride (0.2 g.). The product obtained is poured into water (500 cc.) and sodium hydroxide solution (d.=1.33; 100 cc.) and filtered. The residue obtained is ground in a mortar with water (80 cc.) and sodium hydroxide solution (d.=1.33; 20 cc.), filtered again, and the precipitate washed with water (500 cc.) and dried in vacuo. After recrystallisation from a mixture of methanol (450 cc.) and water (50 cc.), filtering and drying, 1,4-bis[3-(4-quinolylamino)propyl]piperazine (15.9 g.) is obtained in the form of white crystals, M.P. 210° C.

*Example XX*

4-chloro-6-methoxyquinoline (19.3 g.) [prepared according to V. Ramsey and L. Cretcher, J. Amer. Chem. Soc. 69, 1659 (1947)] is heated at 185° C., with stirring, for 5 hours, with 1,4-bis(3-aminopropyl)piperazine (10 g.), phenol (55 g.) and ammonium chloride (0.2 g.). Proceeding as in Example XIX and recrystallising from methanol (200 cc.), followed by dimethylformamide (100 cc.), gives 1,4-bis[3-(6-methoxy-4-quinolylamino)propyl]piperazine (10.5 g.) in the form of yellow crystals, M.P. 245° C.

*Example XXI*

Proceeding as in Example XIX but commencing with 4-chloro-7-dimethylsulphamoylquinoline (10.8 g.), 1,4-bis (3-aminopropyl)piperazine (4 g.), phenol (22 g.) and ammonium chloride (0.1 g.), gives, after recrystallisation from dimethylformamide (65 cc.), 1,4-bis[3-(7-dimethylsulphamoyl-4-quinolylamino)propyl]piperazine (7.2 g.) in the form of white crystals, M.P. 271° C.

4-chloro-7-dimethylsulphamoylquinoline is obtained in the following manner:

A mixture of 3-dimethylsulphamoylaniline (67 g.) and ethyl ethoxymethylenemalonate (76 g.) in diphenyl oxide (230 g.) is heated rapidly, distilling off the ethanol formed. An internal temperature of 236° C. is maintained for 1 hour and, after allowing to cool, cyclohexane (165 cc.) is added. The crystals formed are filtered, washed with cyclohexane (500 cc.) and dried, giving 3-carbethoxy-7-dimethylsulphamoyl - 4-hydroxyquinoline (102 g.), M.P. about 335° C. After saponification by heating under reflux for 3 hours with sodium hydroxide solution (d.=1.33; 155 cc.) and water (465 cc.), the solution is washed with cyclohexane and decanted. By the addition of hydrochloric acid (d.=1.19; 150 cc.) to the aqueous layer, a precipitate is formed which is washed with water and dried, giving 3-carboxy-7-dimethylsulphamoyl-4-hydroxyquinoline (59 g.), M.P. about 310° C. (with decomposition). This compound is decarboxylated by heating at about 200° C. for half an hour in quinoline (250 cc.) in the presence of copper powder (0.6 g.). Cyclohexane (250 cc.) is then added at about 80° C. and a product crystallises which is filtered off. After recrystallisation from a mixture of ethanol (400 cc.) and water (400 cc.), filtering and separating, 7-dimethylsulphamoyl-4-hydroxyquinoline (29 g.), M.P. about 288° C., is obtained. This compound is heated, progressively and with stirring, with phosphorus oxychloride (20 g.) in benzene (120 cc.) and then refluxed for 3 hours. After cooling and pouring onto ice, the solution is made alkaline with sodium hydroxide solution (d.=1.33; 40 cc.), the temperature being kept at about +5° C. After filtering, washing with water and drying, 4-chloro-7-dimethylsulphamoylquinoline (24 g.) is obtained in the form of beige crystals, M.P. 170° C.

*Example XXII*

Proceeding as in Example XIX, commencing with 4-chloro-7-trifluoromethylquinoline (9.25 g.) [prepared according to K. Snyder et coll., J. Amer. Chem. Soc. 69, 372 (1947)], 1,4-bis(3-aminopropyl)piperazine (4 g.), phenol (22 g.) and ammonium chloride (0.1 g.), 1,4-bis [3-(7-trifluoromethyl-4-quinolylamino)propyl]piperazine (8.7 g.) is obtained, after recrystallisation from dimethylformamide (100 cc.), in the form of crystals, M.P. 293° C.

*Example XXIII*

A mixture of 4-[(5-1′-piperazinyl-2-pentyl)(acetyl)] aminoquinoline (33.2 g.), 4-[(5-methanesulphonyloxy-2-pentyl)(acetyl)]aminoquinoline (33 g.), triethylamine (15.1 g.) and toluene (700 cc.), is heated under reflux for 20 hours. After being allowed to cool and acidified by the addition of 2 N hydrochloric acid (250 cc.), decolourising charcoal (0.5 g.) is added and filtered over supercel. The solution is washed with benzene (100 cc.) and the aqueous acid layer decanted and treated with sodium hydroxide solution (d.=1.33; 80 cc.). The organic base thus liberated is extracted with methylene chloride (250 cc. and 5 × 50 cc.) and the organic solution obtained washed with water, decanted, dried over sodium sulphate and filtered. After removal of solvent, a brown resin (48.8 g.) remains which is dissolved in ethanol (200 cc.). By the addition of maleic acid (37.1 g.) in ethanol (150 cc.) followed by filtering and drying the product formed a salt (52.5 g.) is obtained which gives, after recrystallisation from isopropanol (550 cc.), 1,4-bis[4-(4-quinolyl)(acetyl)aminopentyl]piperazine acid dimaleate (38.9 g.), M.P. about 155° C. The base is freed from the salt thus obtained by the addition of sodium hydroxide and extraction with methylene chloride. After the usual treatments, the base (20.3 g.) is obtained (in the form of a resin) which is deacetylated by heating under reflux for 17 hours in a mixture of ethylene glycol (400 cc.), potassium hydroxide pellets (42.5 g.) and water (30 cc.). After concentrating to dryness under a pressure of 20 mm. Hg, pouring into water (2000 cc.) and stirring for 3 hours, the solid obtained is filtered off, washed with water and dried under reduced pressure (20 mm. Hg). After dissolving the solid obtained in dimethylformamide (15 cc.), filtering hot, crystallising and drying in an oven at 70° C./1 mm. Hg, 1,4-bis[4-(4-quinolylamino)pentyl]piperazine (7.3 g.) is obtained in the form of crystals, M.P. about 100° C.

4-[(5-methanesulphonyloxy-2-pentyl)(acetyl)]amino-quinoline is obtained in the following manner:

A mixture is prepared of 4-chloroquinoline (65.4 g.) and 2-aminopentan-5-ol (82.4 g.). Reaction is commenced with a third of the mixture heated to 170° C., the rest of the mixture is added progressively while this temperature is maintained and heating continued for a further 2 hours at 170° C. The reaction mass is poured into water (200 cc.) and the precipitate formed filtered off, washed with water (200 cc.), dried under a pressure of 20 mm. Hg and recrystallised from ethanol (200 cc.), giving 4-(5-hydroxy-2-pentyl)aminoquinoline (68.7 g.), M.P. 158° C. After acetylation with acetic anhydride (490 cc.) by the usual method and purification of the product obtained by washing with aqueous sodium hydroxide solution, dissolving in benzene, washing with water, drying and evaporating the benzene solution, 4[(5-acetoxy-2-pentyl)(acetyl)]aminoquinoline (86 g.) is obtained in the form of a brown resin. This compound is partially deacetylated by heating under reflux for 24 hours with ethanol (330 cc.) and aqueous 12.4 N potassium hydroxide solution (20 cc.). After the usual purification procedures, 4[(5-hydroxy-2-pentyl)(acetyl)]aminoquinoline (52.3 g.) is obtained in the form of a brown resin which is then dissolved in toluene (475 cc.). Triethylamine(19.2 g.) is added and then, while cooling on a water bath, a solution of methanesulphonylchloride (21.7 g.) in toluene (190 cc.). The interior temperature rises to 36° C. After standing overnight, water (300 cc.) is added and, after decanting, the toluene solution is washed with water (4 x 125 cc.). The organic layer is again decanted, dried over sodium sulphate and filtered. A toluene solution (700 cc.) is thus obtained containing 4-[(5-methanesulphonyloxy-2-pentyl)(acetyl)]aminoquinoline (66 g.).

4-[(5-1'-piperazinyl-2-pentyl)(acetyl)]aminoquinoline may be obtained by the following method:

A mixture of the toluene solution of 4-[(5-methanesulphonyloxy-2-pentyl)(acetyl)]aminoquinoline prepared above (350 cc.) and anhydrous piperazine (40.8 g.) is heated under reflux, with stirring, for 15 hours. After being allowed to cool and acidified by the addition of 4 N hydrochloric acid (300 cc.), decolourising charcoal (0.5 g.) is added, filtered on supercel and the filtrate washed with benzene (100 cc.). The decanted aqueous acid layer is treated with sodium hydroxide solution (d.=1.33; 150 cc.) and extracted with methylene chloride (200 cc. and 2 x 100 cc.). The organic layer is washed with water, decanted again, dried over sodium sulphate, filtered and concentrated to dryness at a pressure of 20 mm. Hg, giving 4-[(5-1'-piperazinyl-2-pentyl)(acetyl)]aminoquinoline (27.5 g.) in the form of a brown resin.

Example XXIV

Proceeding as in Example XXIII and commencing with 4-[(5-1'-piperazinyl-2-pentyl)(acetyl)]amino-6-methoxyquinoline (16 g.) and 4-[(5-methanesulphonyloxy-2-pentyl)(acetyl)]amino-6-methoxyquinoline (13.9 g.), there are successively obtained:

1,4-bis[4-(6-methoxy-4-quinolyl)(acetyl)aminopentyl]piperazine acid dimaleate (18 g.), M.P. 155° C.

1,4-bis[4-(6-methoxy-4-quinolyl)aminopentyl]piperazine (3.6 g.) in the form of clear yellow crystals, M.P. 180° C., which resolidify and have a second melting point at 190° C.

4-[(5-methanesulphonyloxy-2-pentyl)(acetyl)]amino-6-methoxyquinoline used as starting material is prepared by the method described in Example XXIII for the preparation of 4-[(5-methanesulphonyloxy-2-pentyl)(acetyl)]aminoquinoline. Starting with 4-chloro-6-methoxyquinoline (33.3 g.) and 2-aminopentan-5-ol (35.5 g.), 4-(5-hydroxy-2-pentyl)amino-6-methoxyquinoline (38.8 g.) is obtained in the form of a resin. By complete acetylation, this compound is converted into 4-[(5-acetoxy-2-pentyl)(acetyl)]amino-6-methoxyquinoline which is partially deacetylated to 4-[(5-hydroxy-2-pentyl)(acetyl)]amino-6-methoxyquinoline. This compound is obtained in the form of beige crystals, M.P. 132° C.; by the action of methanesulphonylchloride it is converted into 4-[(5-methanesulphonyloxy-2-pentyl)(acetyl)]amino-6-methoxyquinoline which is obtained and utilized in the form of a solution in toluene.

4-[(5-1'-piperazinyl-2-pentyl)(acetyl)]amino-6-methoxyquinoline (16 g.) is obtained by the reaction of piperazine (21.5 g.) with a portion of the aforesaid toluene solution containing 4-[(5-methanesulphonyloxy-2-pentyl)(acetyl)]amino-6-methoxyquinoline (19.1 g.).

Example XXV

A mixture of 4-(5-1'-piperazinyl-2-pentyl)amino-7-chloroquinoline (89.5 g.), 4-(2-chloroethyl)amino-7-chloroquinoline (65 g.), sodium iodide (40.5 g.), anhydrous triethylamine (27.2 g.) and methylethyl ketone (1000 cc.) is heated under reflux, with stirring, for 18 hours. After cooling and washing with water (3 x 100 cc.), the organic solution is evaporated and the gummy residue taken up in methylene chloride (1000 cc.) and N sodium hydroxide solution (300 cc.). After stirring, the organic layer is decanted and the solvent evaporated. Methylethyl ketone (500 cc.) is added to the oily residue, producing a crystalline product which is separated and washed with acetone (3 x 100 cc.). After drying in vacuo (0.5 mm. Hg) in the presence of concentrated sulphuric acid, a crude product (93 g.), M.P. 140–150° C. is obtained. This crude product is dissolved in boiling methanol (200 cc.), acetonitrile (1000 cc.) added, and allowed to stand for 24 hours in a refrigerator. The crystalline product which forms is separated, washed with acetone (2 x 100 cc.) and dried for 8 hours at 100° C./0.1 mm. Hg, giving 1-[4-(7-chloro-4-quinolyl)aminopentyl]-4-[2-(7-chloro-4-quinolyl)aminoethyl]piperazine (69 g.), melting at 190–191° C., resolidifying and melting again at 213–215° C.

Example XXVI

A mixture of 4,7-dichloroquinoline (56 g.) and phenol (52.5 g.) is heated to 150° C. and 1,4-bis(2-aminopropyl)-hexahydro-1,4-diazepine (27 g.) then added over 5 minutes. The temperature rises to 210° C. The temperature is allowed to fall to that of the laboratory slowly and the mixture obtained is then poured into a mixture of water (500 cc.) and 10 N sodium hydroxide solution (90 cc.) and extracted with chloroform (600 cc.). The chloroformic extract is treated with an N aqueous solution of methanesulphonic acid (500 cc.), the aqueous solution obtained separated, made alkaline with 10 N sodium hydroxide solution (50 cc.), extracted with chloroform (600 cc.) and chromatographed through a column 60 cm. high and containing alumina (600 g.). After elution with chloroform (1500 cc.), the eluates are concentrated to dryness on a water bath and the oily residue taken up in boiling methylethyl ketone (300 cc.). On cooling, crystals are obtained which are separated, washed with methylethyl ketone (100 cc.) and dried at 60° C./0.1 mm. Hg, giving 1,4 - bis[2-(7-chloro-4-quinolyl)aminopropyl]hexahydro-1,4-diazepine (34 g.), M.P. 169° C.

The 1,4 - bis(2-aminopropyl)-hexahydro-1,4-diazepine serving as starting material in this example can be prepared in the following way:

1,4-bis(2-oxo-propyl)-hexahydro-1,4-diazepine, which is not isolated, is obtained by condensing monochloroacetone (76 g.) with hexahydro-1,4-diazepine and treated with hydroxylamine hydrochloride (69.5 g.). 1,4-bis(2-oximino-propyl)-hexahydro-1,4-diazepine (70 g.), M.P. 180–181° C. is obtained. Reduction of this imine (35 g.) in the presence of Raney nickel gives 1,4-bis(2-aminopropyl)-hexahydro-1,4-diazepine (27 g.).

*Example XXVII*

A mixture comprising 1,4-bis-(2-aminopropyl)-2,5-dimethylpiperazine (20 g.), 4,7-dichloroquinoline (34.7 g.), phenol (117 g.) and ammonium chloride (0.5 g.), is heated under reflux for 4 hours. Proceeding then as in Example XIX and recrystallising from n-propanol (1200 cc.) gives 1,4-bis[2-(7-chloro-4-quinolyl)aminopropyl]-2,5-dimethylpiperazine (12.6 g.) in the form of a white crystalline powder, M.P. 264° C.

*Example XXVIII*

A mixture comprising 1,4-bis(3-aminopropyl)piperazine (15 g.) 4,6-dichloroquinoline (29.9 g.), phenol (82.5 g.) and ammonium chloride (0.5 g.) is heated under reflux for 4 hours. Proceeding as in Example XIX and recrystallising from n-butanol (3840 cc.) gives 1,4 - bis[3 - (6-chloro-4-quinolyl)aminopropyl]piperazine (29.9 g.) in the form of a cream crystalline powder, M.P. 264° C.

The 4,6-dichloroquinoline starting material was prepared according to D. Stanley Tarbell, J. Amer. Chem. Soc. 68, 1278 (1946).

*Example XXIX*

Proceeding as in Example XIX and commencing with 1,4-bis(2-aminopropyl)piperazine (8 g.), 4-chloro-7-trifluoromethylquinoline (18.5 g.), phenol (60 g.) and ammonium chloride (0.02 g.) there is obtained, after recrystallisation from methylethyl ketone (800 cc.), 1,4-bis-[2 - (7 - trifluoro-methyl-4-quinolyl)aminopropyl]piperazine (12 g.) in the form of a white crystalline powder, M.P. 240° C.

*Example XXX*

A mixture comprising 4-(5-1'-piperazinyl-2-pentyl)-amino-7-chloroquinoline (33.2 g.), 4-(3-chloro-2-propyl)-amino-7-chloroquinoline (25.5 g.), sodium iodide (15 g.), triethylamine (11 g.) and methylethyl ketone (400 cc.) is heated under reflux for 18 hours. After evaporating the solvent at 50° C./20 mm. Hg, the residue is taken up in methanol (100 cc.), made alkaline by the addition of sodium hydroxide solution (d.=1.33; 20 cc.) and then poured into water (1000 cc.). The crude product which separates as a brown gum is isolated and dissolved in a methylethyl ketone-acetonitrile (1:10) mixture (1650 cc.). After allowing to crystallise for 48 hours, the crystals are filtered off, washed with the methylethyl ketone-acetonitrile mixture and dried. By recrystallisation from methylethyl ketone (300 cc.) and then from dimethylformamide (100 cc.), 1-[5-(7-chloro-4-quinolyl)amino-2-pentyl] - 4-[2 - (7-chloro-4-quinolyl)aminopropyl]piperazine (10 g.) is obtained in the form of a white crystalline powder, M.P. 210–212° C.

The 4 - (3 - chloro - 2-propyl)amino-7-chloroquinoline starting material of this example may be prepared in the following manner:

4 - (3-hydroxy-2-propyl)amino-7-chloroquinoline (63.1 g.), M.P. 210° C., is obtained by condensing 2-aminopropanol (41.2 g.) with 4,7-dichloroquinoline (99 g.) in phenol (275 g.) and this product (62.0 g.) is treated with thionyl chloride (47.5 g.) in chloroform (180 cc.). 4-(3-chloro-2-propyl)amino-7-chloroquinoline (54.9 g.), M.P. 148–150° C. is thus obtained.

*Example XXXI*

A mixture of 1,4-bis(3-aminopropyl)piperazine (15 g.), 4-chloro-7-methoxyquinoline [prepared according to W. Lauer et coll., J. Amer. Chem. Soc. 68, 1268 (1946)], phenol (83 g.) and ammonium chloride (0.3 g.) is heated under reflux for 4 hours. The reaction mixture is poured into 1.7 N sodium hydroxide solution (1000 cc.) and the brown oil which separates is dissolved in a chloroform-ethanol (9:1) mixture (3000 cc.). This solution is chromatographed on a column 59 cms. high and containing alumina (650 g.). It is eluted with the chloroform-ethanol mixture (5 litres) and, after evaporation of the solvents, the product is recrystallised from ethanol (550 cc.). After filtering, washing with ethanol, and drying, 1,4 - bis[3 - (7-methoxy-4-quinolyl)aminopropyl]piperazine (10.8 g.) is obtained in the form of a cream crystalline powder, M.P. 200° C.

*Example XXXII*

Proceeding as in Example XIX and commencing with 1,4-bis(3-aminopropyl)-2,5-dimethylpiperazine (17.1 g.), 4-chloro-7-methoxyquinoline (30.8 g.), phenol (82.5 g.) and ammonium chloride (0.3 g.), 1,4-bis[3-(7-methoxy-4-quinolyl)aminopropyl]-2,5-dimethylpiperazine (12.1 g.) is obtained, after two successive recrystallisations from ethanol (300 cc. each time), in the form of a pale yellow crystalline powder, M.P. 216° C.

*Example XXXIII*

Proceeding as in Example XIX and commencing with 1,4-bis(3-aminopropyl)piperazine (30 g.), 4,7-dichloro-3-methylquinoline [prepared according to H. Andersag, Ber. 81, 499 (1948)] (63.6 g.), phenol (165 g.) and ammonium chloride (0.6 g.), 1,4-bis[3-(7-chloro-3-methyl-4-quinolyl)aminopropyl]-piperazine (55.5 g.) is obtained, M.P. 198° C., after recrystallisation from n-propanol (2000 cc.).

*Example XXXIV*

A mixture of 4,7-dichloroquinoline (41.6 g.) and phenol (39.5 g.) is heated to 145° C. and 1,4-bis(3-aminopropyl)-hexahydro-1,4-diazepine (22.6 g.) added over 5 minutes. The temperature rises to 200° C. and is then allowed to return to ambient. The reaction mass is poured into water (500 cc.) to which has been added 10 N sodium hydroxide solution (70 cc.). The free base is extracted with methylene chloride (500 cc.) and this extract is treated with normal methanesulphonic acid (400 cc.). The aqueous layer is separated and made alkaline with 10 N sodium hydroxide solution (40 cc.). The free base is extracted with methylene chloride (800 cc.), chromatographed through a column 50 cms. high and 5 cms. in diameter and containing alumina (600 g.) and eluted with methylene chloride (1000 cc.). The eluates are evaporated on the water bath and the crystalline residue is purified by recrystallisation from dimethylformamide (150 cc.), giving, after drying overnight at 70° C./0.1 mm. Hg, 1,4-bis[3-(7-chloro-4-quinolyl)aminopropyl]-hexahydro-1,4-diazepine (14 g.), M.P. 186° C.

The 1,4-bis(3-aminopropyl)-hexahydro - 1,4-diazepine which serves as starting material for this preparation is obtained by the reduction with Raney nickel of 1,4-bis(2-cyanoethyl)-hexahydro-1,4-diazepine (33 g.), itself obtained by the condensation of acrylonitrile (20.8 g.) with hexahydro-1,4-diazepine (18.6 g.).

Example XXXV

A mixture of 4-(3-chloropropyl)amino-7-chloroquinoline (46 g.), 4-(5-1'-piperazinyl-2-pentyl)amino-7-chloroquinoline (60 g.), sodium iodide (27 g.), triethylamine (18.2 g.) and methylethyl ketone (450 cc.) is heated under reflux for 8 hours. The suspension obtained is filtered and the precipitate washed with methylethyl ketone (50 cc.). The filtrate is combined with the washings and the complete organic solution thus produced is washed with distilled water. The decanted organic layer is dried over sodium sulphate and then chromatographed through a column 70 cms. high and 6 cms. in diameter containing alumina (1 kg.). After elution with methylethyl ketone (2 litres), solvent is removed from the eluates and the extract obtained taken up in boiling acetonitrile (200 cc.). After recrystallisation and drying at 50° C. in vacuo (0.2 mm. Hg) for 16 hours, 1-[4-(7-chloro-4-quinolyl)aminopentyl]-4-[3-(7-chloro - 4 - quinolyl)aminopropyl]piperazine (50.5 g.), M.P. 160–162° C., is obtained.

Example XXXVI

A mixture of 4-(3-1'-piperazinyl-2-propyl)amino-7-chloroquinoline (13.2 g.), 4-(3-chloro-2-propyl)amino-6-chloroquinoline (11.0 g.), sodium iodide (6.4 g.), anhydrous triethylamine (2.3 g.) and methylethyl ketone (200 cc.) is heated under reflux for 18 hours. After evaporation of the solvent at a pressure of 20 mm. Hg, the residue is taken up in methanol (100 cc.), made alkaline by the addition of sodium hydroxide solution (d.= 133; 110 cc.) and poured into water (1000 cc.). A product precipitates which is filtered, washed with water and separated. By two successive recrystallisations from dimethylformamide (100 cc. and 60 cc.), 1-[2-(7-chloro-4-quinolyl)aminopropyl] - 4 - [2-(6 - chloro-4-quinolyl) aminopropyl]piperazine (11.0 g.) is obtained in the form of a white crystalline powder, M.P. 208–210° C.

The 4-(3 - chloro - 2-propyl)amino-6-chloroquinoline starting material of this example may be prepared in the following manner:

4-(3 - hydroxy-2-propyl)amino-6-chloroquinoline (16.0 g.), M.P. 192° C., is obtained by condensing 2-aminopropanol (8.25 g.) with 4,6-dichloroquinoline (19.8 g.) in boiling phenol (55 g.). This compound (14.0 g.) is treated with thionyl chloride (10.6 g.) in chloroform (40 cc.), giving 4-(3-chloro-2-propyl)amino-6-chloroquinoline (12.5 g.), M.P. 142° C.

Example XXXVII

A mixture of 4-(3-1'-piperazinyl-2-propyl)amino-7-chloroquinoline (19.4 g.), 4-(3-chloro-2-propyl)amino-7-methoxyquinoline (16.0 g.), sodium iodide (9.6 g.), anhydrous triethylamine (3.3 g.) and methylethyl ketone (300 cc.) is heated under reflux for 18 hours. After evaporation of the solvent under a pressure of 20 mm. Hg, the residue is taken up in methanol (100 cc.), made alkaline by the addition of sodium hydroxide solution (d.=1.33; 10 cc.) and poured into water (1000 cc.). A brown gum forms which is isolated and dissolved in boiling methylethyl ketone (120 cc.). Crystals form on cooling which are filtered off, washed with methylethyl ketone (20 cc.) and dried. By two successive recrystallisations from dimethylformamide (50 cc. each time), 1-[2-(7 - chloro-4-quinolyl)aminopropyl]-4-[2-(7-methoxy-4-quinolyl)amino]piperazine (10.4 g.) is obtained in the form of a white crystalline powder, M.P. 206–208° C.

The 4 - (3-chloro-2-propyl)amino-7-methoxyquinoline starting material for this example can be prepared in the following manner:

By condensing 2-aminopropanol (16.5 g.) with 4-chloro-7-methoxyquinoline (38.6 g.) in boiling phenol (110 g.), 4-(3-hydroxy-2-propyl)amino-7-methoxyquinoline (20.6 g.), M.P. 170° C., is obtained. This compound (20.0 g.) is treated with thionyl chloride (15.2 g.) in chloroform (60 cc.), giving 4-(3-chloro-2-propyl)amino-7-methoxyquinoline (17.1 g.), M.P. 160° C.

Example XXXVIII

A mixture of 4-(3-1'-piperazinyl-2-propyl)amino-7-chloroquinoline (15.2 g.), 4-(2-chloroethyl)amino-7-chloroquinoline (12.0 g.), sodium iodide (7.5 g.), anhydrous triethylamine (5.5 g.) and methylethyl ketone (200 cc.) is heated under reflux for 16 hours. After evaporation of the solvent under a pressure of 20 mm. Hg, the residue is taken up in methanol (120 cc.) and the suspension obained is poured into 0.5 N sodium hydroxide solution (1000 cc.). A product precipitates which is filtered, washed with water and dried. It is then redissolved in a methylene chloride-ethanol (95:5) mixture (265 cc.), chromatographed through a column 60 cms. high filled with alumina (530 g.) and eluted with methylene chloride-ethanol (95:5) mixture (500 cc.). The eluates are concentrated to dryness on the water bath and the residue is redissolved in boiling methylethyl ketone (700 cc.). By cooling, a product is crystallised. It is separated, washed with methylethyl ketone (60 cc.) and dried at 150° C./0.5 mm. Hg, giving 1-[2-(7-chloro-4 - quinolyl)aminopropyl]-4-[2-(7-chloro - 4 - quinolyl) aminoethyl]piperazine (13.2 g.) in the form of a white crystalline powder, M.P. 178° C.

Example XXXIX

A mixture of 6-acetamido-4-chloroquinaldine (11.7 g.), 1,4-bis(2-aminopropyl)piperazine (5.0 g.), phenol (28 g.) and ammonium chloride (0.1 g.) is heated for 4 hours under reflux and, after cooling, the reaction product is poured into acetone (200 cc.). A gum separates which is isolated and stirred for 16 hours with acetone (400 cc.), filtered, washed with acetone (200 cc.) and dried. This product is dissolved in water (250 cc.) and made alkaline with sodium hydroxide solution (d.=1.33; 10 cc.). The base which separates is filtered off, washed with water and dried, giving, after recrystallisation from ethanol (100 cc. and 70 cc.), 1,4-bis[2-(6-acetamido-2-methyl-4-quinolyl)aminopropyl]piperazine (2.7 g.) in the form of a white crystalline powder, M.P. 330° C. (with decomposition).

The 6-acetamido-4-chloroquinaldine starting material is prepared according to R. U. Schock, J. Amer. Chem. Soc. 79, 1672 (1957).

Example XL

A mixture of 2-4'-chlorophenyl-4,7-dichloroquinoline (15.4 g.), 1,4-bis(3-aminopropyl)piperazine (5.0 g.), phenol (30 g.) and ammonium chlorine (0.1 g.) is heated at 160–170° C. for 4 hours and the product formed then poured into 2 N sodium hydroxide solution (325 cc.). A precipitate forms which is filtered off, washed with water and dried. Recrystallisation from dimethylformamide (650 cc. and 500 cc.) gives 1,4-bis[3-(2-4'-chlorophenyl-7-chloro-4-quinolyl)aminopropyl]piperazine (8.1 g.), M.P. 320–321° C.

The 2-4' - chlorophenyl-4,7-dichloroquinoline starting material is prepared according to H. Gilman and R. Benkeser, J. Amer. Chem. Soc. 69, 123 (1947).

Example XLI

A mixture of 4,5-dichloro-3-methylquinoline (31.8 g.), 1,4-bis-(3-aminopropyl)piperazine (15.0 g.), phenol (82.5 g.), and ammonium chloride (0.3 g.) is heated at 120° C. for 2 hours and the product obtained is then poured into water (800 cc.) to which has been added sodium hydroxide solution (d.=1.33; 170 cc.). The precipitated base is filtered off, washed with water (150 cc.) and dried. Recrystallisation from methylethyl ketone (75 cc.) followed by isopropanol (60 cc.) gives 1,4-bis[3-(5-chloro-3-methyl-4-quinolyl)aminopropyl]piperazine (15.0 g.) in the form of a white crystalline powder, M.P. 96° C.

The 4,5-dichloro-3-methylquinoline starting material is prepared according to H. Andersag, Ber. 81, 499 (1948).

Example XLII

A mixture of 4,6-dichloroquinoline (39.6 g.), 1,4-bis(2-aminopropyl)piperazine (20 g.), phenol (110 g.) and ammonium chloride (0.5 g.) is heated, with stirring, for 5 hours at 165–175° C. and then poured into a mixture of water (100 cc.) and sodium hydroxide solution (d.=1.33; 200 cc.). After stirring for 16 hours, filtering, washing with water (5 x 100 cc.) and separating, the solid obtained is dissolved in chloroform (250 cc.). The chloroformic solution is washed with water (3 x 100 cc.) and concentrated to dryness at a pressure of 20 mm. Hg. The residue is treated with acetone (500 cc.) and a product crystallises. After drying, a product (24.5 g.) is obtained which is recrystallised from dimethylformamide (100 cc.), filtered, washed with acetone and dried at 100° C./0.1 mm. Hg, giving crystalline 1,4-bis[2-(6-chloro-4-quinolyl)aminopropyl]piperazine (19.5 g.), melting at 220° C., resolidifying and melting again at 246–248° C.

Example XLIII

A mixture of 4,7-dichloroquinoline (64 g.) and phenol (72 g.) is heated, with stirring, to 120° C. The reaction is exothermic and at the end of half an hour the temperature reaches 160° C. The reaction mixture is allowed to cool to 100° C. and 1,4-bis(4-aminobutyl)piperazine (37 g.) added. The temperature is raised to 160° C. and kept at this figure for 5 hours. After cooling to 100° C., the reaction product is poured into a solution of sodium hydroxide (160 g.) in distilled water (1500 cc.). The crude base precipitates, initially as a gum which is then crystallised by cooling in icewater. After separating and drying at 45° C./0.2 mm. Hg for 3 hours, a base (100 g.) is obtained, the recrystallisation of which from dimethylformamide (300 cc.) gives 1,4-bis[4-(7-chloro-4-quinolyl)-aminobutyl]piperazine (67 g.), M.P. 239–241° C.

The 1,4-bis(4-aminobutyl)piperazine starting material used in this example is prepared in the following manner:

Condensation of 3-chlorobutyronitrile (257 g.) with piperazine (103 g.) gives 1,4-bis(3-cyanopropyl)piperazine (175 g.), M.P. 105–107° C., which is then (75 g.) reduced catalytically to give 1,4-bis(4-aminobutyl)-piperazine (40 g.), B.P. 141° C./0.3 mm. Hg.

Example XLIV 1,4 - bis[2-(6-acetamido-2-methyl-4-quinolyl)aminopropyl]piperazine (51 g.), prepared as described in Example XXXIX, is heated under reflux for 4 hours in hydrochloric acid (d.=1.19; 170 cc.) and water (340 cc.). After cooling, water (1500 cc.) is added and the solution made alkaline with sodium hydroxide solution (d.=1.33; 250 cc.). The base which precipitates is filtered off, washed with water and dried, giving, on recrystallisation from an ethanol-water (3:1) mixture (750 cc.), 1,4-bis-[2-(6-amino-2-methyl-4-quinolyl)aminopropyl]piperazine (20 g.), M.P. 305° C.

Example XLV

A mixture of 4-chloro-6-methoxyquinaldine (51.9 g.), 1,4-bis(2-aminopropyl)piperazine (25.0 g.), phenol (200 g.) and ammonium chloride (0.5 g.) is heated under reflux for 3 hours and the reaction mixture is then poured into water (1500 cc.) to which has been added sodium hydroxide solution (d=1.33; 500 cc.). After stirring for 12 hours, the precipitated base is filtered, washed with water, dried and then dissolved in methylene chloride (1400 cc.). The solution obtained is chromatographed over alumina (1400 g.) and eluted with methylene chloride (12 litres). The solvent is driven off from the eluates and the dry extract recrystallised from ethanol (340 cc.) giving 1,4-bis-[2-(6-methoxy-2-methyl-4-quinolyl)aminopropyl]-piperazine (22.4 g.), M.P. 244° C.

Example XLVI

A mixture of 4-chloro-7-methoxyquinoline (77.4 g.), 1,4-bis(4-aminopentyl)piperazine (51.3 g.), and phenol (75.3 g.) is heated at 125° C. for 25 hours. The reaction mixture is poured into water (480 cc.) to which has been added sodium hydroxide solution (d.=1.33; 160 cc.). The base is extracted with chloroform (1250 cc.) and the chloroformic layer washed with water, dried and concentrated to dryness in vacuo. The dry extract is redissolved in methylene chloride (1600 cc.) and chromatographed over alumina (1600 g.). After elution with methylene chloride (7 litres), solvent is driven off from the eluate and the dry extract recrystallised successively from methylethyl ketone, methylene chloride, isopropanol and, finally, methylene chloride, giving 1,4-bis[4-(7-methoxy-4-quinolyl)aminopentyl]piperazine (2.7 g.), M.P. 218° C.

Example XLVII

A mixture of 4-(3-1'-piperazinyl-2-propyl)amino-7-chloroquinoline (15.8 g.), 2-4'-chlorophenyl-4-(3-chloro-2-propyl)amino-7-chloroquinoline (19.0 g.), sodium iodide (7.8 g.), anhydrous triethylamine (5.3 g.) and methylethyl ketone (200 cc.) is heated under reflux for 20 hours. After cooling and making alkaline by the addition of sodium hydroxide solution (d.=1.33; 25 cc.), the solvent is evaporated at a pressure of 20 mm. Hg. The gummy residue is washed with water (250 cc.), decanted and the product recrystallised from methylethyl ketone (70 cc.), giving, after a further recrystallisation from dimethylformamide (20 cc.), 1-[2-(2-p-chlorophenyl-7-chloro - 4 - quinolyl)aminopropyl] - 4 - [2 - (7 - chloro-4-quinolyl)aminopropyl]piperazine (7.3 g.), M.P. 230–232° C.

Example XLVIII

A mixture of 4,7-dichloroquinoline (64 g.) and phenol (72 g.) is heated to 120° C. with stirring, the reaction commences and the temperature rises to 160° C. External heating is stopped and the temperature allowed to fall to 100° C. 1,4-bis(4-aminobutyl)piperazine (37 g.) is then added in a single portion and heated at 155–160° C. for 5 hours. After being allowed to cool to 100° C., the reaction mixture is poured into a mixture of sodium hydroxide solution (d.=1.33; 400 cc.) and distilled water (1200 cc.).

The crude gummy base obtained is stirred while being cooled with ice-water. After 2 hours the base sets. The aqueous alkaline solution is decanted, distilled water (1200 cc.) added and stirring is resumed for 30 minutes. The solid material is filtered off, washed with distilled water (250 cc.) and dried in vacuo (0.2 mm. Hg) for 16 hours at 45° C. The crude base obtained (100 g.) is dissolved in dimethylformamide (300 cc.) at 120° C., decolourising charcoal (6 g.) added, and filtered hot. On cooling, the base crystallises and is separated, washed with dimethylformamide (250 cc.) and dried in vacuo (0.2 mm. Hg) for 16 hours at 45° C. and then for 3 hours at 100° C., giving 1,4-bis[4-(7-chloro-4-quinolyl)aminobutyl]piperazine (68 g.), M.P. 240–242° C.

The 1,4-bis(4-aminobutyl)piperazine used as starting material in this example is prepared in the following manner:

Condensation of 3-chlorobutyronitrile (257 g.) with piperazine (103 g.) in the presence of dry sodium iodide (375 g.) and anhydrous triethylamine (255 g.) in methylethyl ketone, gives 1,4-bis(3-cyanopropyl)piperazine (250 g.), M.P. 104–105° C. Catalytic reduction in the presence of Raney nickel of this compound (75 g.) gives 1,4-bis(4-aminobutyl)piperazine (40 g.), B.P. 140–141° C./0.3 mm. Hg.

Example XLIX

A mixture of L(+)-4-(3-1'-piperazinyl-2-propyl)amino-7-chloroquinoline (21.4 g.), L(+)-4-(3-chloro-2-propyl)amino-7-chloroquinoline (17.9 g.), dry sodium iodide (10.5 g.), anhydrous triethylamine (7.1 g.) and methylethyl ketone (175 cc.) is heated, with stirring, under reflux for 8 hours. The precipitate formed is separated, washed with methylethyl ketone (40 cc.), followed by distilled water (250 cc.) and dried in vacuo (0.2 mm. Hg) for 2 hours at 60° C., giving the crude base (34 g.), M.P. about 245° C.

The above base (34 g.) is dissolved in dimethylformamide (250 cc.) near the boiling point and, after the addition of decolourising charcoal (1 g.), the solution is filtered hot and left to crystallise in the refrigerator for 16 hours. Filtration, washing with dimethylformamide (40 cc.) and drying in vacuo (0.2 mm. Hg) for 3 hours at 60° C. gives the base (23.8 g.), M.P. about 250° C., a further recrystallisation of which under the same conditions, gives L(+)-1,4-bis[2-(7-chloro-4-quinolyl)piperazine (20.8 g.), M.P. 250–251° C.; optical rotation $[\alpha]_D^{23.5} = +382° \pm 1°$ (c.=4, methanol/water 50/50).

The L(+)-4-(3-1'-piperazinyl-2-propyl)amino-7-chloroquinoline used as starting material in this example is prepared in the following manner:

Condensation of 4,7-dichloroquinoline (84 g.) with L(+)-alaninol (64.7 g.) gives L(+)-4-(3-hydroxy-2-propyl)amino-7-chloroquinoline (81.7 g.), M.P. 223–224° C.; $[\alpha]_D^{24} = +28.5° \pm 2°$ (c.=1, ethanol). Chlorination of this compound (81 g.), with thionylchloride (81.5 g.) gives L(+)-4-(3-chloro-2-propyl)amino-7-chloroquinoline (74.7 g.), M.P. 146–147° C.;

$$[\alpha]_D^{24} = +103° \pm 1°$$

(c.=2, ethanol). Condensation of this chlorinated compound (25.5 g.) with anhydrous piperazine (43 g.) gives L(+) - 4 - (3 - 1' - piperazinyl - 2 - propyl)amino - 7-chloroquinoline (22.6 g.), M.P. 128–130° C.;

$$[\alpha]_D^{23} = +139° \pm 1°$$

(c.=2, ethanol).

*Example L*

Proceeding as in Example XLIX but using D(—)-4-(3-1'-piperazinyl-2-propyl)amino-7-chloroquinoline (13 g.), D(—)-4-(3-chloro-2-propyl)amino-7-chloroquinoline (10.85 g.), dry sodium iodide (6.4 g.), anhydrous triethylamine (4.3 g.) and methylethyl ketone (106 cc.), gives D(—)-1,4-bis[2-(7-chloro - 4 - quinolyl)aminopropyl]piperazine (12.4 g.), M.P. 250–251° C.; optical rotation $[\alpha]_D^{25} = -382.5° \pm 1°$ (c.=4, methanol/water 50/50).

The D(—)-4-(3-1'-piperazinyl-2-propyl)amino-7-chloroquinoline used as starting material in this example is obtained as follows:

Condensation of 4,7-dichloroquinoline (79 g.) with D(—)-alaninol (61 g.) gives D(—)-4-(3-hydroxy-2-propyl)amino-7-chloroquinoline (83.3 g.), M.P. 223–224° C.; $[\alpha]_D^{25} = -31° \pm 2°$ (c.=1, ethanol). Chlorination of this compound (80.5 g.) with thionyl chloride (81 g.) gives D(—)-4-(3-chloro-2-propyl)amino-7-chloroquinoline (73.3 g.), M.P. 147–148° C.; $[\alpha]_D^{24} = -101° \pm 1°$ (c.=2, ethanol). Condensation of this chlorinated compound (70 g.) with anhydrous piperazine (118.5 g.) gives D(—) - 4 - (3 - 1' - piperazinyl - 2 - propyl)amino - 7-chloroquinoline (60.1 g.), M.P. 131–132° C.;

$$[\alpha]_D^{23} = -137° \pm 1°$$

(c.=2, ethanol).

*Example LI*

A mixture of L(+)-1,4-bis[2-(7-chloro-4-quinolyl)aminopropyl]-piperazine (1.50 g.) prepared in Example XLIX, D(—)-bis[2-(7-chloro-4-quinolyl)-aminopropyl]piperazine (1.50 g.) prepared in Example L, in dimethylformamide, is dissolved under reflux. On cooling, a product crystallises which is separated, washed with dimethylformamide (15 cc.) and dried in vacuo (0.2 mm. Hg) at 60° C. for 16 hours, giving DL-1,4-bis[2-(7-chloro-4-quinolyl)aminopropyl]piperazine (2.45 g.), M.P. 266–268° C.

*Example LII*

A mixture of D(—)-4-(3-1' - piperazinyl - 2 - propyl)amino-7-chloroquinoline (22.9 g.), L(+)-4-(3-chloro-2-propyl)amino-7-chloroquinoline (19.15 g.), sodium iodide (11.25 g.), and anhydrous triethylamine (7.6 g.) in methylethyl ketone (187 cc.) is heated under reflux with stirring for 8 hours. The precipitate formed is filtered off, washed with methylethyl ketone (50 cc.) and the filter-cake is then suspended in a solution of pure methanesulphonic acid (29 g.) in distilled water (300 cc.). After heating to 50° C. to bring about solution, decolourising charcoal (1 g.) is added. The solution is filtered and made alkaline by the addition of sodium hydroxide solution (d.=1.33; 30 cc.). The crude base which precipitates solidifies after stirring for 1 hour and is separated, washed with distilled water (100 cc.) and dried in vacuo (0.2 mm. Hg) at 60° C. for 16 hours, giving a crude base (31 g.), M.P. 264–266° C. This crude base (30 g.) is dissolved at 140° C. in dimethylformamide (250 cc.) and on cooling, a base (26.3 g.), M.P. 268–269° C. is obtained. A further recrystallisation under the same conditions as those indicated above gives meso-1,4-bis[2-(7-chloro-4-quinolyl)aminopropyl]piperazine (23.6 g.), M.P. 270–271° C.

The starting materials for this example are prepared as indicated in Examples L and XLIX respectively.

By intimately grinding equimolecular quantities of the DL-1,4-bis[2-(7-chloro - 4 - quinolyl)aminopropyl]piperazine described in Example LI and the meso-1,4-bis[2-(7-chloro - 4 - quinolyl)aminopropyl]piperazine described above, a mixture melting at 250–252° C. is obtained.

*Example LIII*

4,6-dichloroquinoline (39.6 g.) is heated at 175° C. with stirring for 5 hours with 1,4-bis(2-aminopropyl)piperazine (20 g.), phenol (110 g.), and ammonium chloride (0.5 g.). The mixture is then poured into water (1000 cc.) and sodium hydroxide solution (d.=1.33; 200 cc.), stirred for 16 hours, filtered and washed with water (500 cc.). The precipitate is dissolved in chloroform (250 cc.) with gentle heating and washed with water (3 x 100 cc.). The organic layer is decanted, chloroform (100 cc.) distilled off and stood in a refrigerator overnight. After filtration, crystals (13.6 g.), M.P. about 220° C., are obtained which are recrystallised from dimethylformamide (50 cc.), filtered off and washed with dimethylformamide (20 cc.) and acetone (2 x 1.5 cc.). After separating and drying, white crystals are obtained of 1,4-bis[2-(6-chloro-4-quinolyl)aminopropyl]piperazine, form A (8.8 g.), M.P. 227° C.

The chloroformic mother-liquors, from which the initial crop of crystals (13.6 g.) was obtained, are concentrated to dryness in vacuo. The residue is taken up in acetone (400 cc.) and heated under reflux. After cooling and filtering, crystals (24.5 g.), M.P. about 236° C., are obtained. On recrystallisation from dimethylformamide (100 cc.), crystals (containing 9% dimethylformamide) (19.5 g.), are obtained, melting at 210° C., resolidifying and then melting at 245° C. The crystals are dissolved in N hydrochloric acid (140 cc.) and water (140 cc.) by heating to 70° C. After filtering hot with decolourising charcoal, the base is precipitated by adding with stirring, at 70° C., a solution of sodium hydroxide solution (d.=1.33; 15 cc.) in water (35 cc.). After stirring overnight at 20° C. and filtering, the residue is ground and washed with water (500 cc. total). Drying at 20° C. under reduced pressure (12 mm. Hg) in the presence of sulphuric acid gives white crystals (containing 1.5% water) (16 g.) of 1,4-bis[2-(6-chloro-4-quinolyl)aminopropyl]piperazine, form B, melting at 110° C., resolidifying and melting again at 245° C.

The present invention further includes within its scope pharmaceutical compositions which comprise one or more piperazine derivatives of general Formula I or VII or non-toxic acid addition salts thereof together with a pharmaceutical carrier or coating. The invention include especially some compositions made up for oral, rectal, or parenteral administration.

Solid compositions for oral administration include compressed tablets, pills, dispersible powders, and granules. In such solid compositions one or more of the active compounds is or are admixed with at least one inert diluent such as calcium carbonate, potato starch, alginic acid, sucrose or lactose. The compositions may also comprise, as is normal practice, additional substances other than inert diluents, e.g. lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and preserving, perfuming, sweetening and flavouring agents.

The compositions according to the invention for oral administration including capsules of absorbable material such as gelatin containing one or more of the active substances with or without the addition of diluents or excipients.

Preparations according to the invention for parenteral administration include sterile aqueous or non-aqueous solutions, suspensions, or emulsions. Examples of non-aqueous solvents or suspending media are propylene glycol, polyethylene glycol, vegatable oils such as olive oil, and injectable organic esters usch as ethyl oleate. These compositions may also contain adjuvants such as preserving, wetting, emulsifying and dispersing agents. They may be sterilized by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

Compositions for rectal administration are suppositories which may contain, in addition to the active substance, excipients such as cocoa butter or a suitable wax base.

The percentage of active ingredient in the compositions of the invention may be varied, it being necessary that it should constitute a proportion such that a suitable dosage for the therapeutic effect desired in the species of animal shall be obtained. Generally, the dosages should be between 0.5 and 15 mg. per kilogramme in weight of the animal treated. In human medicine, preparations of the present invention should be administered so as to give in general for use as antimalarials, anthelminitics or amoebicides a dosage of 0.1 to 1.5 g. of active substance per day and for use as anti-inflammatories or antirheumatics a dosage of 0.02 to 0.5 g. of such substance per day.

The following examples illustrate pharmaceutical compositions according to the invention.

*Example LIV*

Tablets weighing 500 mg. are prepared having the following composition:

| | Mg. |
|---|---|
| 1,4-bis[4-(7 - chloro-4-quinolylamino)pentyl]piperazine, form A | 250 |
| Starch | 190 |
| Silica gel | 50 |
| Magnesium stearate | 10 |

*Example LV*

Tablets are prepared having the following ingredients:

| | Mg. |
|---|---|
| 1,4-bis[4-(7 - chloro-4-quinolylamino)pentyl]piperazine, form A | 100 |
| Starch | 217 |
| Silica gel | 30 |
| Magnesium stearate | 3 |

*Example LVI*

Tablets weighing 500 mg. are prepared having the following composition:

| | Mg. |
|---|---|
| 1,4 - bis[3-(7-chloro - 4-quinolylamino)propyl]piperazine | 250 |
| Starch | 190 |
| Silica gel | 50 |
| Magnesium stearate | 10 |

*Example LVII*

A solution is prepared having the folowing composition:

| | | |
|---|---|---|
| 1,4 - bis[4-(7-chloro-4-quinolylamino)pentyl]piperazine, form A | g.. | 2.0 |
| 1 N methanesulphonic acid | cc.. | 13.8 |
| 0.1 N sodium hydroxide | cc.. | 25 |
| 10% solution of sodium methanesulphonate | cc.. | 10 |
| Distilled water, q.s. 100 cc. | | |

This solution is divided into 5 cc. ampoules and the ampoules are then sealed and sterilised by heating at 120° C. for 20 minutes.

*Example LVIII*

Tablets weighing 500 mg. are prepared having the following composition:

| | Mg. |
|---|---|
| 1-[2-(7-chloro - 4 - quinolyl)aminopropyl]-4-[2-(6-chloro-4-quinolyl)aminopropyl]piperazine | 250 |
| Starch | 190 |
| Silica gel | 50 |
| Magnesium stearate | 10 |

*Example LIX*

Tablets are prepared having the following composition:

| | Mg. |
|---|---|
| 1-[2 - (7-chloro-4-quinolyl)aminopropyl]-4 - [2-(7-chloro-4-quinolyl)aminoethyl]piperazine | 100 |
| Starch | 217 |
| Silica gel | 30 |
| Magnesium stearate | 3 |

We claim.

1. An aminoquinoline derivative selected from the class consisting of compounds of the formula:

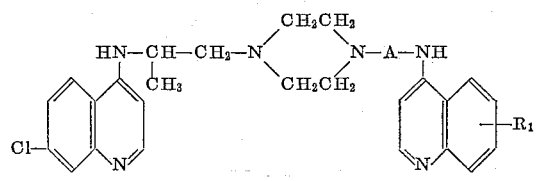

wherein A represents a member selected from the class consisting of

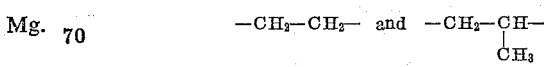

and $R_1$ represents a substituent selected from the class of 6- and 7-chlorine atoms, and non-toxic acid addition salts of any of the said compounds.

2. 1,4 - bis[2-(7-chloro-4-quinolylamino)propyl]piperazine.

3. 1-[2 - (7-chloro-4-quinolylamino)propyl] - 4-[2-(6-chloro-4-quinolylamino)propyl]piperazine.

4. 1-[2-(7 - chloro-4-quinolylamino)propyl]-4-[2 - (7-chloro-4-quinolylamino)ethyl]piperazine.

References Cited by the Examiner

UNITED STATES PATENTS 2,534,774  12/50  Jacob et al. _____ 260—268
2,901,484  8/59  Schock _____ 260—268
3,020,283  2/62  Schock et al. _____ 260—268

FOREIGN PATENTS 226,725  3/58  Australia.
1,167,458  8/58  France.
842,203  6/52  Germany.

NICHOLAS S. RIZZO, *Primary Examiner.*

DUVAL T. McCUTCHEN, WALTER A. MODANCE,
*Examiners.*